United States Patent [19]

Shinohara et al.

[11] Patent Number: 5,724,204
[45] Date of Patent: Mar. 3, 1998

[54] APPARATUS AND METHOD OF REPRODUCING SYNCHRONIZATION SIGNAL IN DISC STORAGE SYSTEM

[75] Inventors: Tohru Shinohara, Kawasaki; Shuichi Hashimoto, Tokyo, both of Japan

[73] Assignee: Fujitsu Limited, Kawasaki, Japan

[21] Appl. No.: 237,404

[22] Filed: May 2, 1994

Related U.S. Application Data

[63] Continuation of Ser. No. 748,956, Aug. 20, 1991, abandoned.

[30] Foreign Application Priority Data

Aug. 20, 1990 [JP] Japan .................... 2-218533

[51] Int. Cl.$^6$ .................... G11B 5/596
[52] U.S. Cl. .................... 360/77.05; 360/51
[58] Field of Search .................... 360/77.06, 77.05,
360/51, 37.1, 38.1, 77.08, 77.07, 77.11,
36.1; 307/597, 603, 269; 386/113, 114,
48, 84

[56] References Cited

U.S. PATENT DOCUMENTS

| | | | |
|---|---|---|---|
| 4,202,019 | 5/1980 | Popoff et al. | 360/51 |
| 4,419,701 | 12/1983 | Harrison et al. | 360/77.02 X |
| 4,604,756 | 8/1986 | Moustakas et al. | 360/37.1 X |
| 4,807,063 | 2/1989 | Moteki et al. | 360/77.07 |
| 4,872,155 | 10/1989 | Yokogawa et al. | 369/59 |
| 4,908,812 | 3/1990 | Aoshima et al. | 369/57 |
| 4,910,617 | 3/1990 | Brunnett et al. | 360/77.05 X |
| 5,115,359 | 5/1992 | Sidman | 360/51 X |

FOREIGN PATENT DOCUMENTS

| | | |
|---|---|---|
| 0220007 | 4/1987 | European Pat. Off. . |
| 0243729 | 11/1987 | European Pat. Off. . |
| 0321942 | 6/1989 | European Pat. Off. . |

OTHER PUBLICATIONS

European Search Report, The Hague, search completed Mar. 10, 1991.

*Primary Examiner*—Andrew L. Sniezek
*Attorney, Agent, or Firm*—Staas & Halsey

[57] ABSTRACT

An apparatus and a method of reproducing a synchronization signal in a disc storage system. The apparatus includes disc mechanism having a plurality of information storage discs in one of which a predetermined servo pattern is recorded, and a corresponding plurality of reproducing heads, one of the heads reading the servo pattern from the corresponding disc to thereby output a servo signal, a synchronization signal demodulating unit, responsive to the servo signal from the disc mechanism, for demodulating a synchronization signal in synchronization with a rotation of the discs, a synchronization clock generating unit for generating a clock signal with a predetermined frequency in synchronization with the synchronization signal, and a gate unit. For a predetermined period, the gate unit prohibits a supply of the synchronization signal from the synchronization signal demodulating unit to the synchronization clock generating unit. As a result, it is possible to prevent an erroneous detection of a synchronization signal due to a spike noise, an undesirable signal by a defect of a medium, or the like, and thus realize a precise reproducing of the synchronization signal.

56 Claims, 16 Drawing Sheets

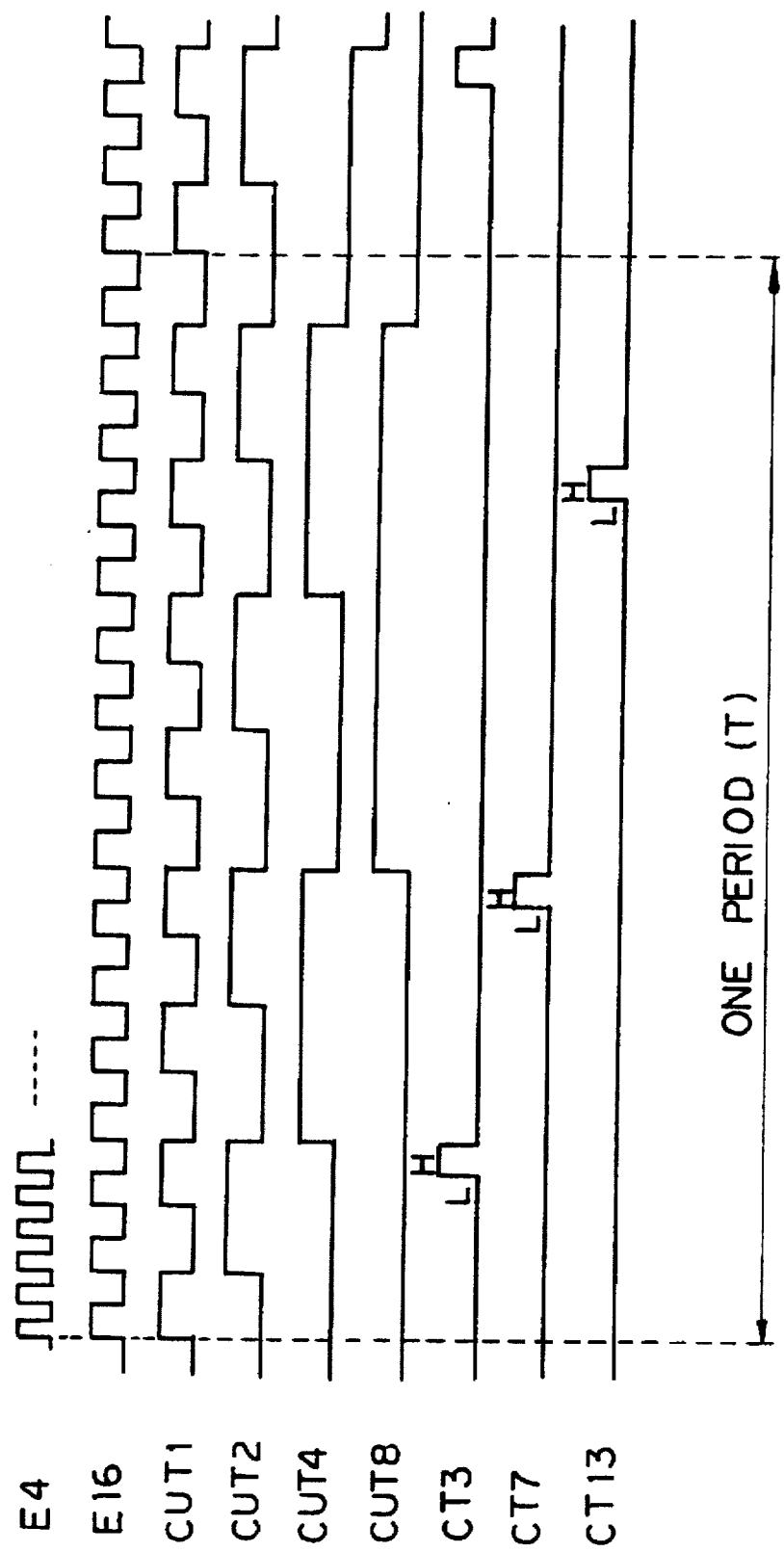

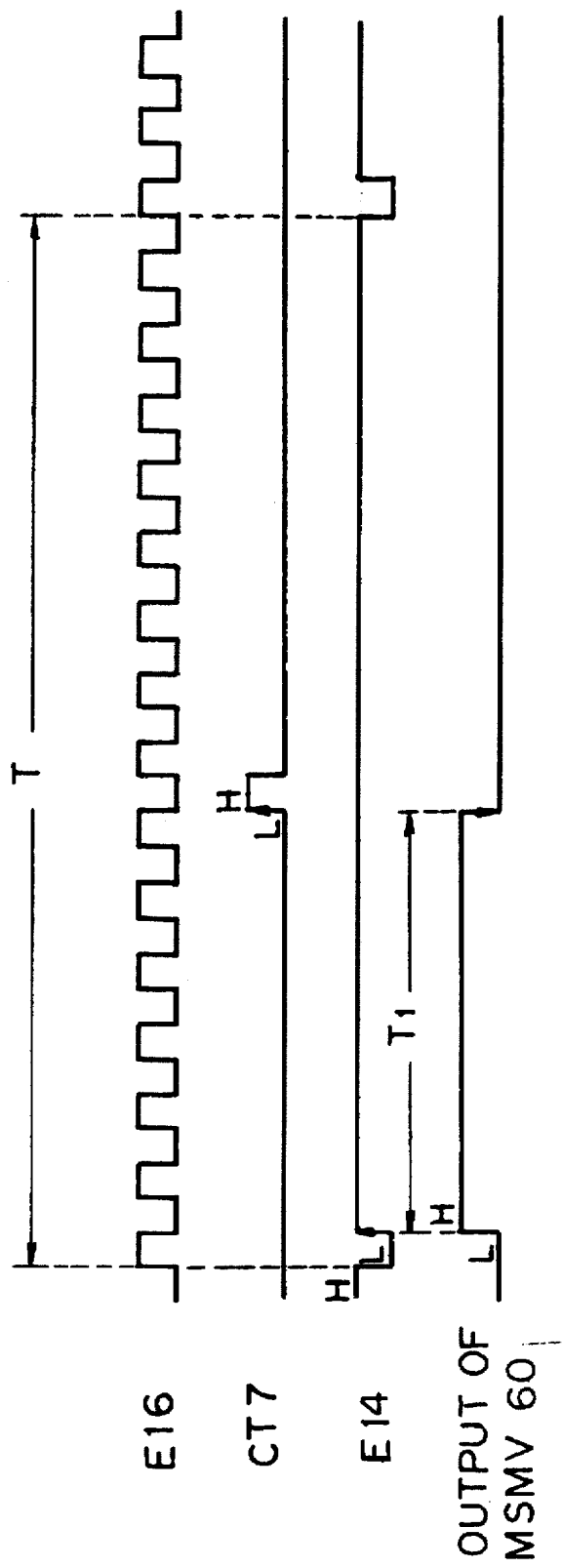

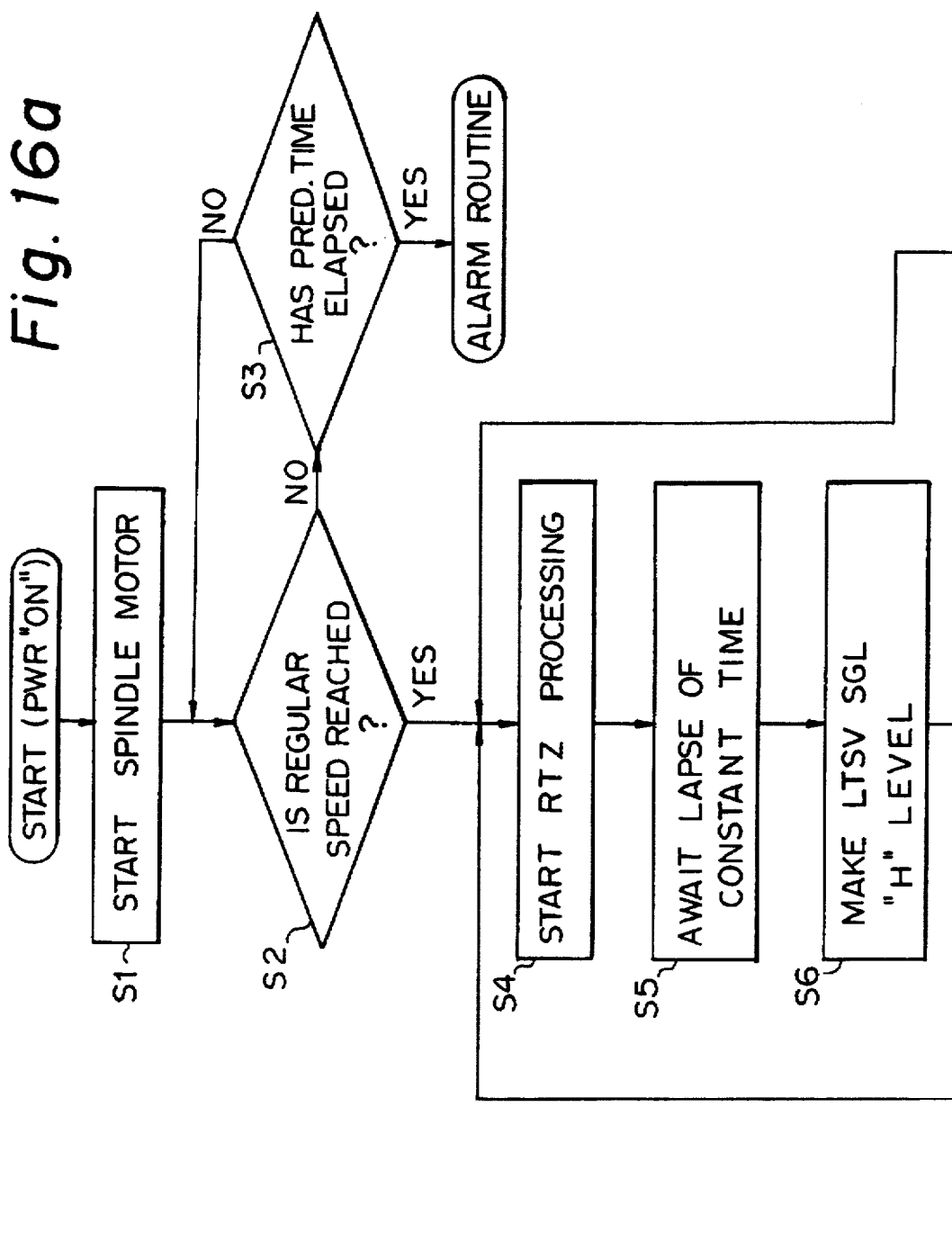

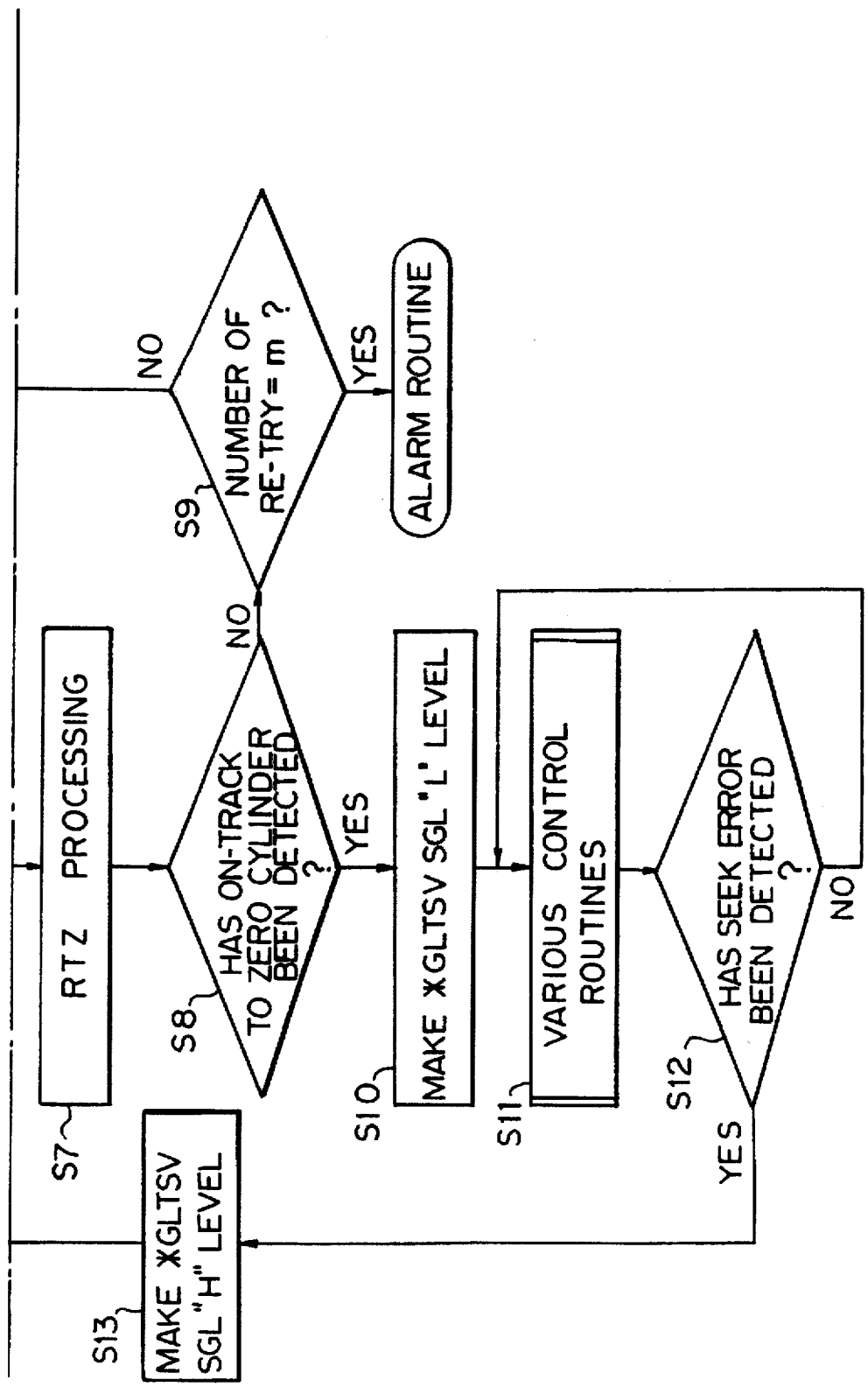

APPARATUS AND METHOD OF REPRODUCING SYNCHRONIZATION SIGNAL IN DISC STORAGE SYSTEM

This application is a continuation of application No. 07/748,956, filed Aug. 20, 1991, now abandoned.

BACKGROUND OF THE INVENTION

1. Field of the Invention

The present invention relates to a technique of reproducing a synchronization signal in a disc storage system. More particularly, it relates to an improvement of a disc-drive apparatus in a magnetic disc storage system, which demodulates a synchronization signal in synchronization with a rotation of the disc based on a servo signal read from a servo disc via a servo head and generates a basic clock signal for data writing or a window signal for use of a demodulation of a position signal for head positioning.

2. Description of the Related Art

In recent years, a magnetic disc storage system has been demanded to enable a high density writing and high speed head positioning, i.e., a high speed access, and morever to carry out a stable operation. To this end, it is necessary to generate a basic clock signal in precise synchronization with a synchronization signal demodulated from a servo signal. Also, it is necessary to use a window signal based on the synchronization signal demodulated from the servo signal to thereby demodulate a high quality head position signal. Accordingly, a synchronization signal demodulated from a servo signal must be prevented from being erroneously detected. Otherwise, it is necessary to suppress an erroneous detection of the synchronization signal to a minimum extent.

In a known disc-drive apparatus, however, a problem occurs in the case that a spike noise, an undesirable signal, or the like, is contained in a servo signal read out by the servo head. For example, where a spike noise occurs between signal patterns forming the synchronization signal, the synchronization signal is demodulated at an unexpected time and thus an erroneous detection thereof is carried out. This results in a fluctuation in level of a basic clock signal based on the synchronization signal, appearance of a jitter in the write signal, occurrence of a positioning error in the position servo loop, or the like.

The problem in the prior art will be explained in detail later in contrast with the preferred embodiment of the present invention.

SUMMARY OF THE INVENTION

An object of the present invention is to provide a disc storage system in which a synchronization signal can be precisely reproduced.

Another object of the present invention is to provide a disc-drive apparatus which can prevent an erroneous detection of a synchronization signal due to a spike noise, an undesirable signal by a defect of a medium, or the like, to thereby contribute to reliable data writing or precise head positioning.

According to the fundamental aspect of the present invention, there is provided an apparatus for reproducing a synchronization signal in a disc storage system, including: a disc mechanism including a plurality of information storage discs in one of which a predetermined servo pattern is recorded, and a corresponding plurality of reproducing heads, one of the reproducing heads reading the servo pattern from the corresponding information storage disc to thereby output a servo signal; a synchronization signal demodulating unit, responsive to the servo signal from the disc mechanism, for demodulating a synchronization signal in synchronization with a rotation of the information storage discs; a synchronization clock generating unit for generating a clock signal with a predetermined frequency in synchronization with the synchronization signal; and a gate unit, operatively connected between the synchronization signal demodulating unit and the synchronization clock generating unit, for prohibiting a supply of the synchronization signal from the synchronization signal demodulating unit to the synchronization clock generating unit for a predetermined period.

According to another aspect of the present invention, there is provided an apparatus for reproducing a synchronization signal in a disc storage system, including: a disc mechanism including a servo disc in which at least one predetermined servo pattern is recorded, and a servo head for reading the servo pattern from the servo disc to thereby output a servo signal; a synchronization signal demodulating unit, responsive to the servo signal from the disc mechanism, for demodulating a synchronization signal in synchronization with a rotation of the servo disc; a synchronization clock generating unit for generating a clock signal with a predetermined frequency in synchronization with the synchronization signal; and a gate unit, operatively connected between the synchronization signal demodulating unit and the synchronization clock generating unit, for prohibiting a supply of the synchronization signal from the synchronization signal demodulating unit to the synchronization clock generating unit for a predetermined period.

In a preferable aspect of the present invention, the predetermined period is defined by a period covering from when a synchronization signal is obtained by the synchronization signal demodulating unit until a subsequent synchronization signal is obtained thereby.

Also, according to another aspect of the present invention, there is provided an apparatus for reproducing a synchronization signal in a magnetic disc storage system, including: a magnetic disc mechanism including a servo disc in which at least one predetermined servo pattern is recorded, a servo head for reading the servo pattern from the servo disc to output a servo signal, and a drive motor for driving the servo head to follow a designated target position; a synchronization signal demodulating circuit, responsive to the servo signal from the magnetic disc mechanism, for demodulating a synchronization signal in synchronization with a rotation of the servo disc; a synchronization clock generating circuit for generating a clock signal with a predetermined frequency in synchronization with the synchronization signal; and a gate circuit operatively connected between the synchronization signal demodulating circuit and the synchronization clock generating circuit; a head positioning circuit for generating a position signal indicating a position of the servo head based on the servo signal from the disc mechanism and window signals from the synchronization clock generating circuit and, based on the position signal, controlling the drive motor to cause the servo head to follow the designated target position; and a processor, responsive to the clock signal fed from the synchronization clock generating circuit, for generating control signals for making the function of the gate circuit effective or ineffective, and controlling the head positioning circuit and the synchronization signal demodulating circuit, wherein the gate circuit prohibits a supply of the synchronization signal from the synchronization signal demodulating circuit to the synchronization clock generating circuit for a period covering from when a synchronization signal is obtained by the synchronization signal demodulating circuit until a subsequent synchronization signal is obtained thereby.

Furthermore, according to another aspect of the present invention, there is provided a method of reproducing a synchronization signal in a system having a disc mechanism which includes at least one servo disc and generates a servo signal based on information from the servo disc, the method including the steps of: demodulating a synchronization signal based on the servo signal from the disc mechanism; making the demodulated synchronization signal effective or ineffective according to control information generated under a predetermined condition; and generating a synchronization clock signal in synchronization with the demodulated synchronization signal when the demodulated synchronization signal is made effective, to thereby reproduce the synchronization signal.

BRIEF DESCRIPTION OF THE DRAWINGS

Other objects and features of the present invention will be described hereinafter in detail by way of preferred embodiments with reference to the accompanying drawings, in which:

FIG. 14 is a timing chart for explaining the operation of the counter circuit of FIG. 13;

FIG. 15 is a timing chart for explaining the operation of the PLL circuit of FIG. 12; and FIGS. 16a and 16b are flow charts for explaining the processings at a power-ON start, executed by the apparatus of FIG. 3.

DESCRIPTION OF THE PREFERRED EMBODIMENTS

For a better understanding of the preferred embodiment of the present invention, the problem in the prior art will be explained with reference to FIG. 1.

Figure 1:
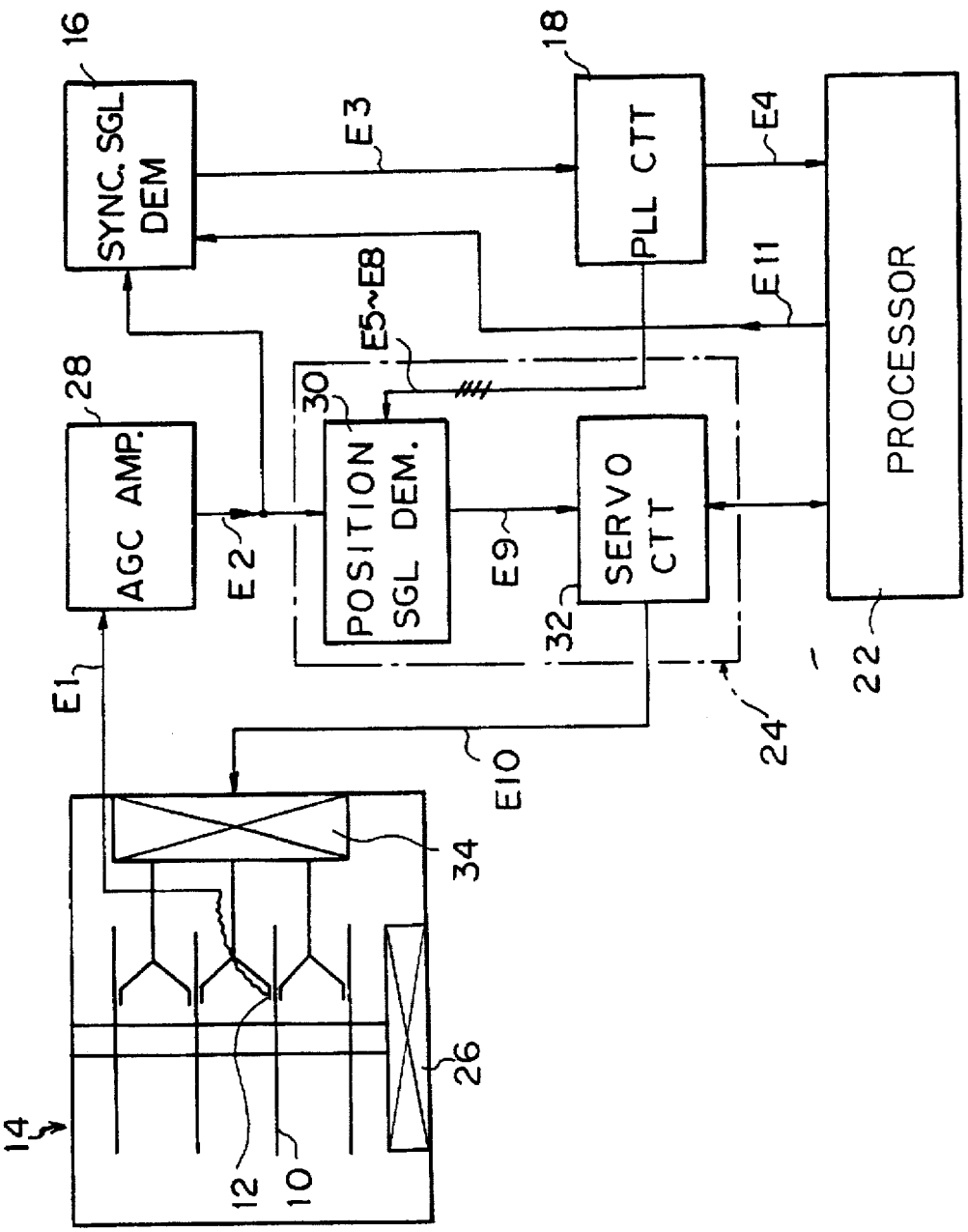
FIG. 1 is a block diagram illustrating part of a prior art disc-drive apparatus.

FIG. 1 illustrates part of a prior art disc-drive apparatus.

In the illustration, reference 14 denotes a disc mechanism 14, which is provided with a plurality of magnetic discs each rotated with a constant speed by a spindle motor 26. One of the magnetic discs is a servo disc 10 in which predetermined servo patterns are recorded. The servo patterns in the servo disc 10 are read out by a servo head 12 and output as a servo signal E1.

The servo signal E1 from the servo head 12 is amplified by an automatic gain control (AGC) amplifying circuit 28 and then fed as a synchronization signal E2 to a synchronization signal demodulating circuit 16 and a position signal demodulating circuit 30 in a head positioning unit 24. The synchronization signal demodulating circuit 16, for example, includes the circuit as shown in FIG. 7, and the operation thereof is shown in FIG. 8.

Figure 7:
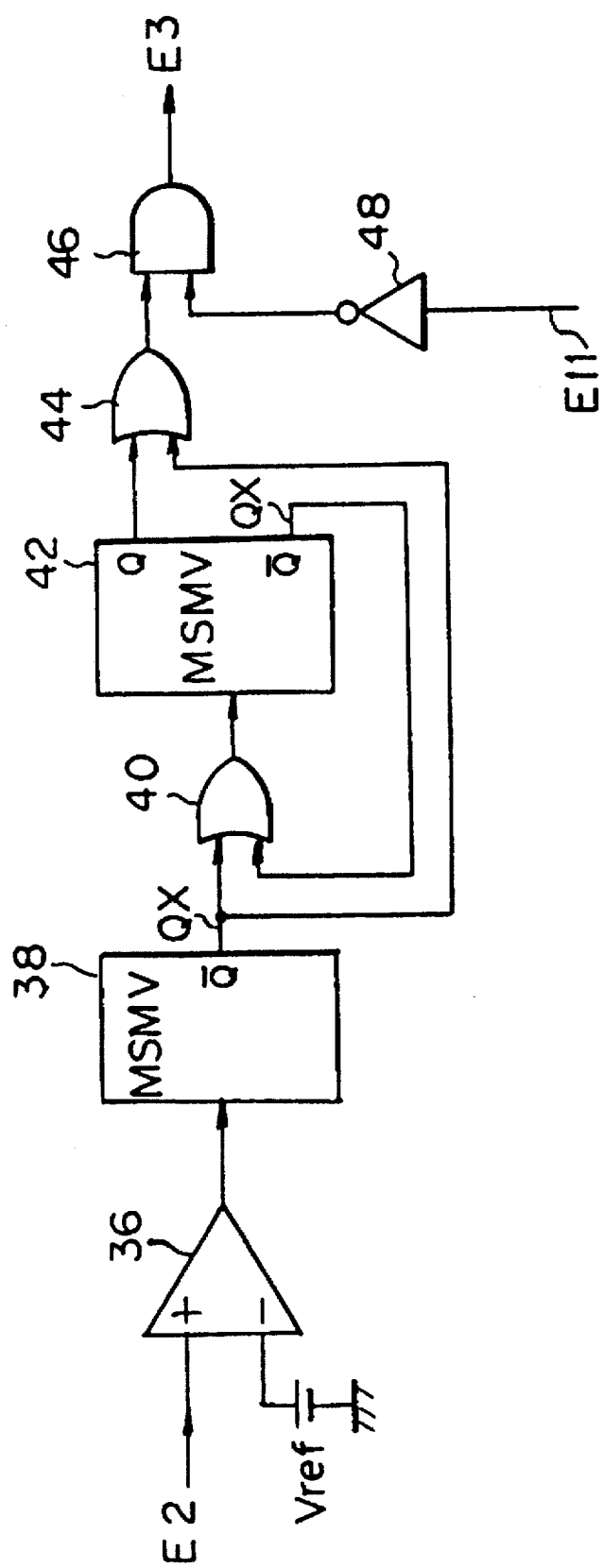
FIG. 7 is a circuit diagram illustrating the synchronization signal demodulating circuit shown in FIG. 3.
Figure 8:
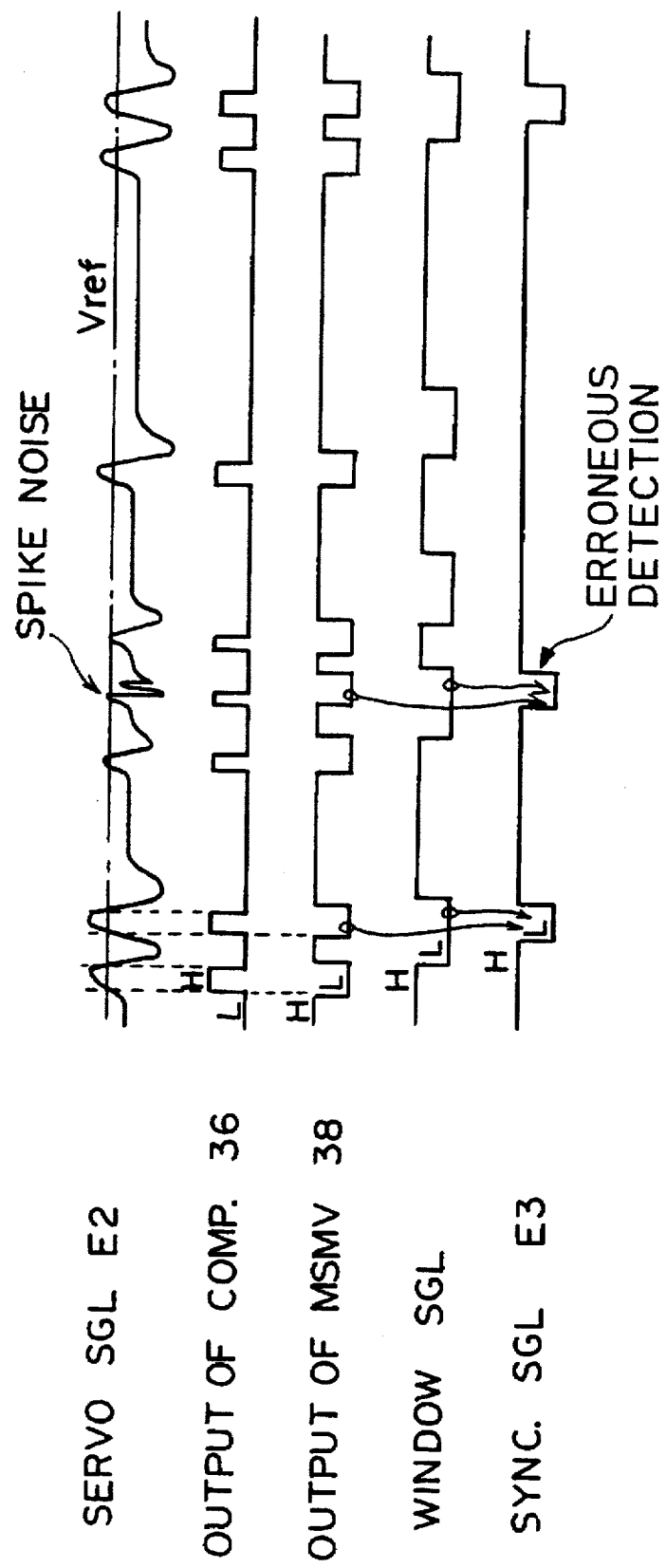
FIG. 8 is a timing chart for explaining the operation of the synchronization signal demodulating circuit of FIG. 7.

Referring to FIGS. 7 and 8, the synchronization signal demodulating circuit 16 first compares the synchronization signal (servo signal) E2 with a reference voltage Vref in a comparator 36 and then produces a comparison output of "H" level when the servo signal E2 exceeds the reference voltage Vref. The comparison output is converted by a monostable multivibrator (MSMV) 38 into a signal with a constant pulse width. The subsequent monostable multivibrator 42 responds to the signal with a constant pulse width and produces a window signal with a constant pulse width, which is triggered at a first rise of two successive pulses in the output of the MSMV 38. Then, the window signal and the output of the MSMV 38 are input to a logical OR gate 44, which outputs a synchronization signal E3 in synchronization with one rotation of the disc.

The synchronization signal E3 demodulated by the synchronization signal demodulating circuit 16 is fed to a phase-locked loop (PLL) circuit unit 18 functioning as a synchronization clock generating circuit. The PLL circuit unit 18 then generates a clock signal E4 with a predetermined frequency in synchronization with the synchronization signal E3 by the phase control using the synchronization signal E3 as a reference signal, and outputs the signal E4 to a processor 22. The processor 22 uses the clock signal E4 as a basic signal in the data writing operation or a reference clock signal for discrimination of a data signal in the regenerative operation. Also, the PLL circuit unit 18 generates window signals E5, E6, E7 and E8 based on the synchronization signal E4 and feeds the window signals to a position signal demodulating circuit 30. The position signal demodulating circuit 30 sets peak hold times for the servo signal based on the window signals to thereby demodulate a position signal E9 indicating a head position. The position signal E9 is fed to a servo circuit 32, which drives a voice coil motor 34 of the disc mechanism 14 using a drive signal E10 so that the head follows a target position designated by the processor 22. Note, after the rotational speed of the disc is increased by a power-ON start and then reaches a regular speed and thus a return-to-zero (RTZ) processing of positioning the servo head on a zero cylinder (e.g., outermost cylinder in the disc mechanism 14) is started, the processor 22 makes effective a lock-to-servo (LTSV) signal E11 and thereby causes the synchronization signal demodulating circuit 16 to start its demodulating operation.

In the prior art apparatus, however, a problem occurs in that, where a spike noise, an undesirable signal due to a defect of the medium, or the like, is contained in the servo signal read out by the servo head, the synchronization signal is demodulated at an unexpected time and thus an erroneous detection thereof is carried out.

For example, where a spike noise occurs between signal patterns forming the synchronization signal, as shown in the servo signal E2 of FIG. 8, the synchronization signal is demodulated at an unexpected time. When the synchronization signal is erroneously demodulated, the clock signal E4 fed to the processor 22 from the PLL circuit unit 18 and the window signals E5 to E8 fed to the position signal demodulating circuit 30 therefrom fluctuate in level. As a result, a drawback arises in that a jitter occurs in the write signal, or that the position signal cannot be demodulated and thus a positioning error occurs in the position servo loop.

Figure 2A:
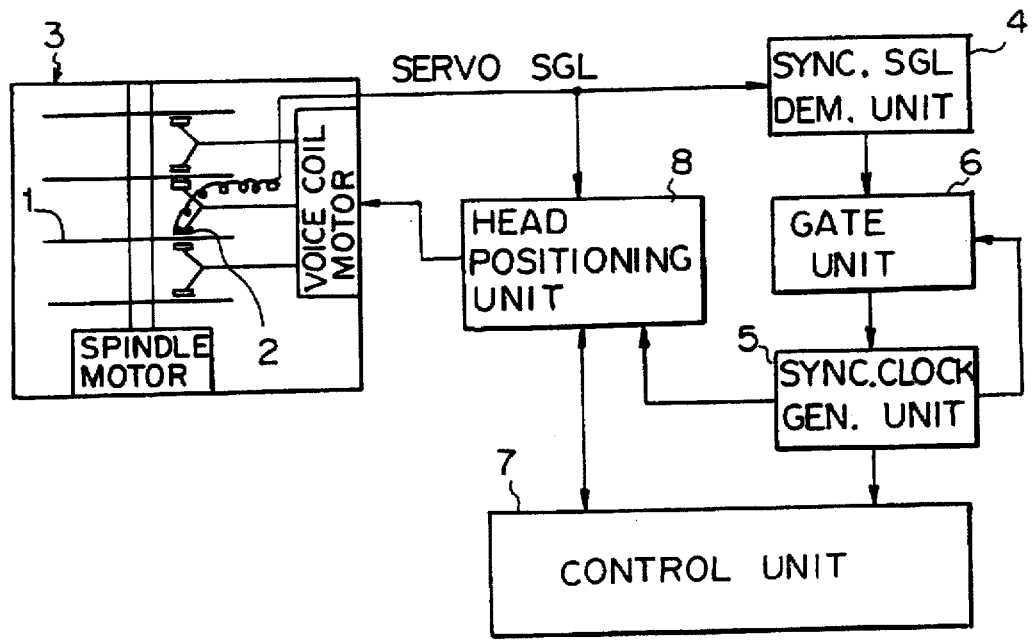
FIGS. 2a and 2b are a block diagram and a timing chart for explaining the principle of the disc-drive apparatus according to the present invention.
Figure 2B:
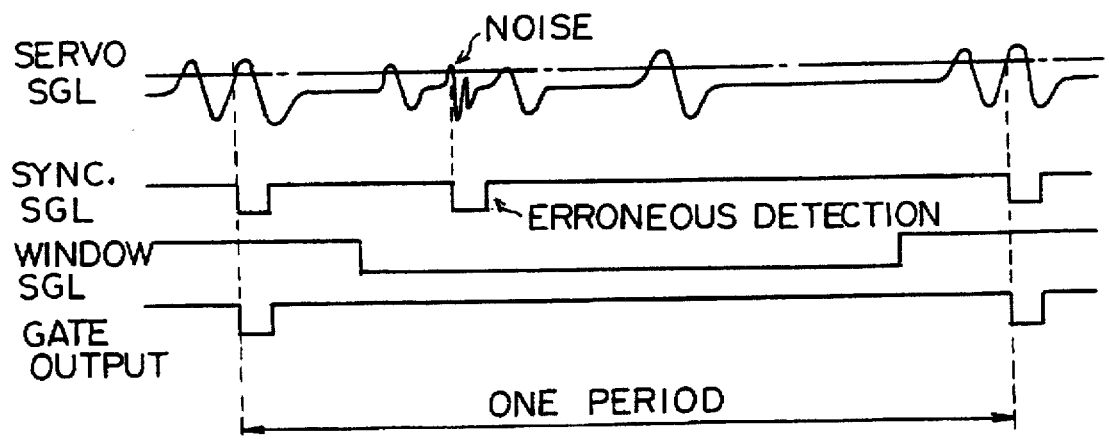

FIGS. 2a and 2b show the principle of the disc-drive apparatus according to the present invention.

As shown in FIG. 2a, the disc-drive apparatus having a function of reproducing a synchronization signal according to the present invention includes: a disc mechanism 3 including a servo disc 1 in which at least one predetermined servo pattern is recorded, and a servo head 2 for reading the servo pattern from the servo disc 1 to output a servo signal; a synchronization signal demodulating unit 4, responsive to the servo signal from the disc mechanism 3, for demodulating a synchronization signal in synchronization with a rotation of the servo disc 1; a synchronization clock generating unit 5 for generating a clock signal with a predetermined frequency in synchronization with the synchronization signal; and a gate unit 6 for prohibiting a supply of the synchronization signal from the synchronization signal demodulating unit 4 to the synchronization clock generating unit 5 for a predetermined period. In the preferred embodiment of the present invention, the predetermined period is defined by a period covering from when a synchronization signal is obtained by the synchronization signal demodulating unit 4 until a subsequent synchronization signal is obtained thereby.

According to the above, the apparatus of the present invention functions as shown in the timing chart of FIG. 2b.

Namely, even if a spike noise, an undesirable signal due to a defect of the medium, or the like, is contained in the servo signal read from the servo head 2 and thus the synchronization signal is erroneously demodulated, the gate unit 6 prohibits a supply of the demodulated synchronization signal to the synchronization clock generating unit 5 for the predetermined period, i.e., for a period other than right times at which the demodulation is to be carried out. Accordingly, it is possible to remove a drawback in that a jitter occurs in the write signal due to an erroneously demodulated synchronization signal, and thus prevent a case that the head position signal cannot be demodulated, from happening. Namely, it is possible to reproduce a precise synchronization signal which enables a high density writing, a high speed head positioning and an extremely stable head positioning.

Figure 3:
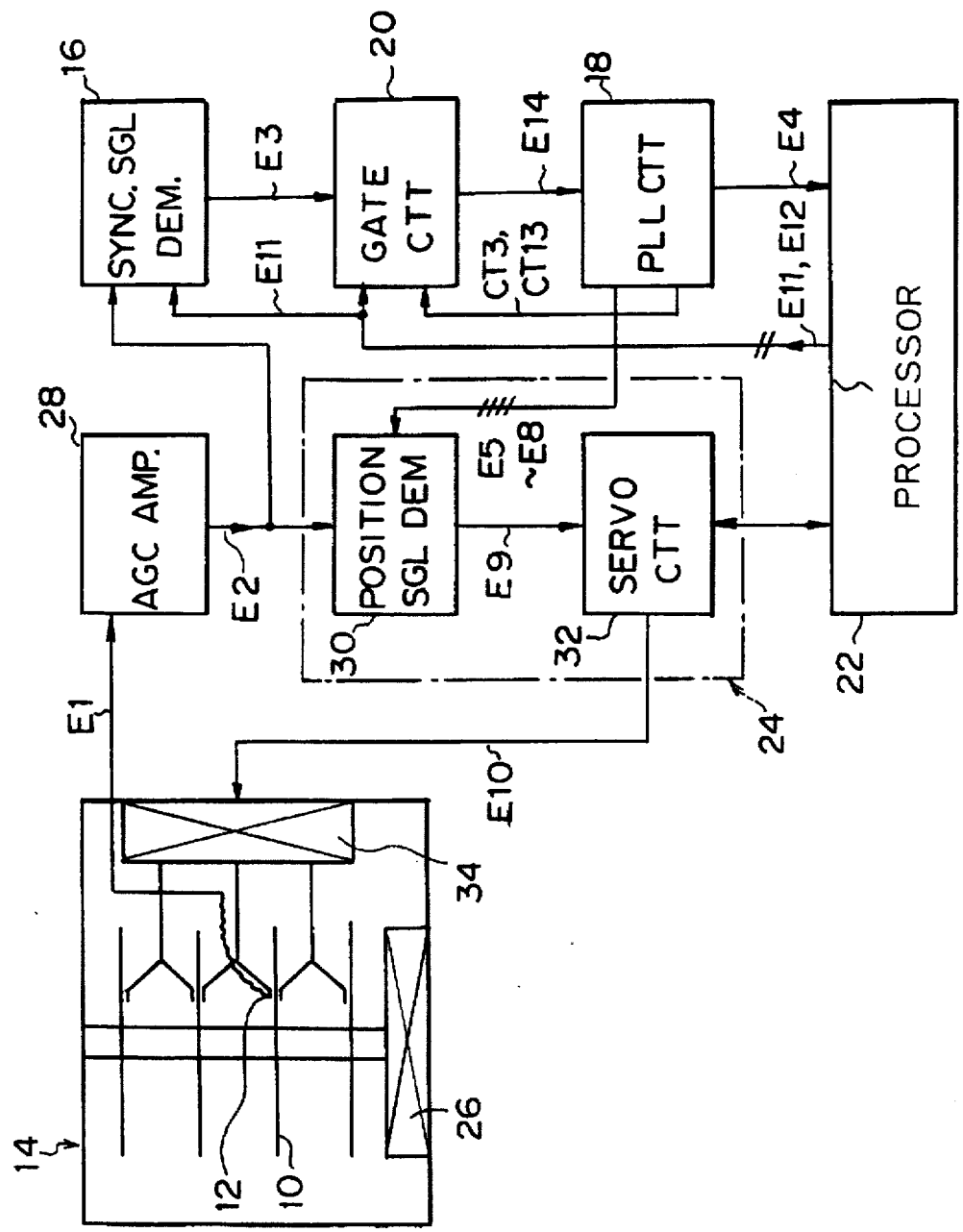
FIG. 3 is a block diagram illustrating part of the disc-drive apparatus as an embodiment of the present invention.

FIG. 3 illustrates part of the disc-drive apparatus as an embodiment of the present invention.

Referring to FIG. 3, the disc mechanism 14 is provided with a plurality of magnetic discs each rotated with a constant speed by the spindle motor 26. One of the magnetic discs is the servo disc 10 in which predetermined servo patterns P1 to P4 (see FIG. 4) are repeatedly recorded.

The servo head 12 provided for the servo disc 10 is moved and positioned together with other heads by the voice coil motor 34 in the radial direction of the corresponding disc. The servo head 12 reads the servo patterns from the servo disc 10 and outputs the servo signal E1 to the outside of the disc mechanism 14.

Details of the servo pattern in the servo disc 10 and the servo signal E1 read out by the servo head 12 will be explained with reference to FIG. 4.

Figure 4:
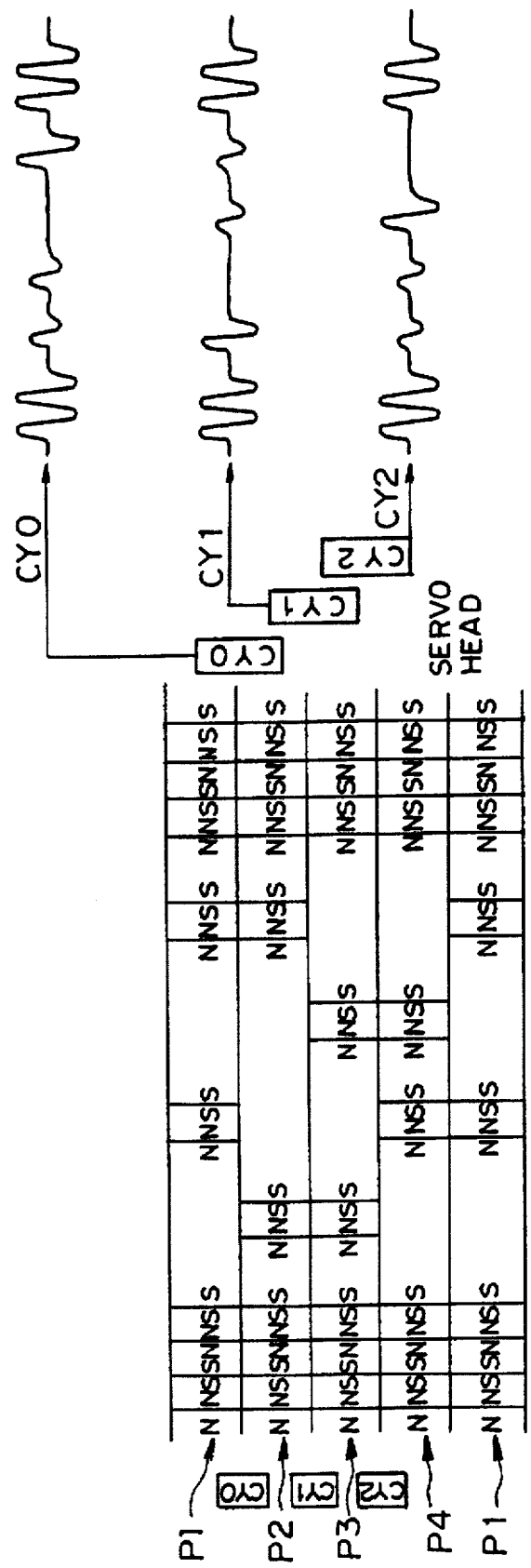
FIG. 4 is an explanatory view of the servo pattern and the servo signal used in the embodiment of FIG. 3.

The portion of the left side of FIG. 4 shows a magnetic record status of servo patterns on five tracks taken from the servo disc 10. From the up side of the illustration, the servo patterns P1, P2, P3 and P4 are recorded in sequence and, thereafter in the same manner, the servo patterns P1 to P4 are repeatedly recorded in the radial direction of the disc. Also, each of the servo patterns P1 to P4 is formed in the circumferential direction (track direction) of the disc such that the respective proper magnetic record is made between each synchronization pattern consisting of three "NS"s recorded with a small pitch, and that it is repeatedly recorded in the circumferential direction of the disc.

The portion of the right side of FIG. 4 shows one pattern of a signal waveform of the servo signal E1 obtained when the servo head 12 is located in the sequence of cylinders CY0, CY1 and CY2. For example, a signal waveform of the servo signal E1 obtained when the servo head 12 is located at the position of the cylinder CY2 includes three amplitude patterns having two relatively small amplitude changes and one relatively big amplitude change between two cycles of the synchronization pattern.

Referring to FIG. 3 again, the servo signal E1 output from the servo head 12 is amplified by the AGC amplifying circuit 28 and then fed as the synchronization signal (servo signal) E2 to the synchronization signal demodulating circuit 16 and the position signal demodulating circuit 30 in the head positioning unit 24.

The position signal demodulating circuit 30 in the head positioning unit 24 uses the window signals E5 to E8 obtained from a synchronization signal E14 (explained later) to thereby demodulate the position signal E9 indicating the head position.

Figure 5:
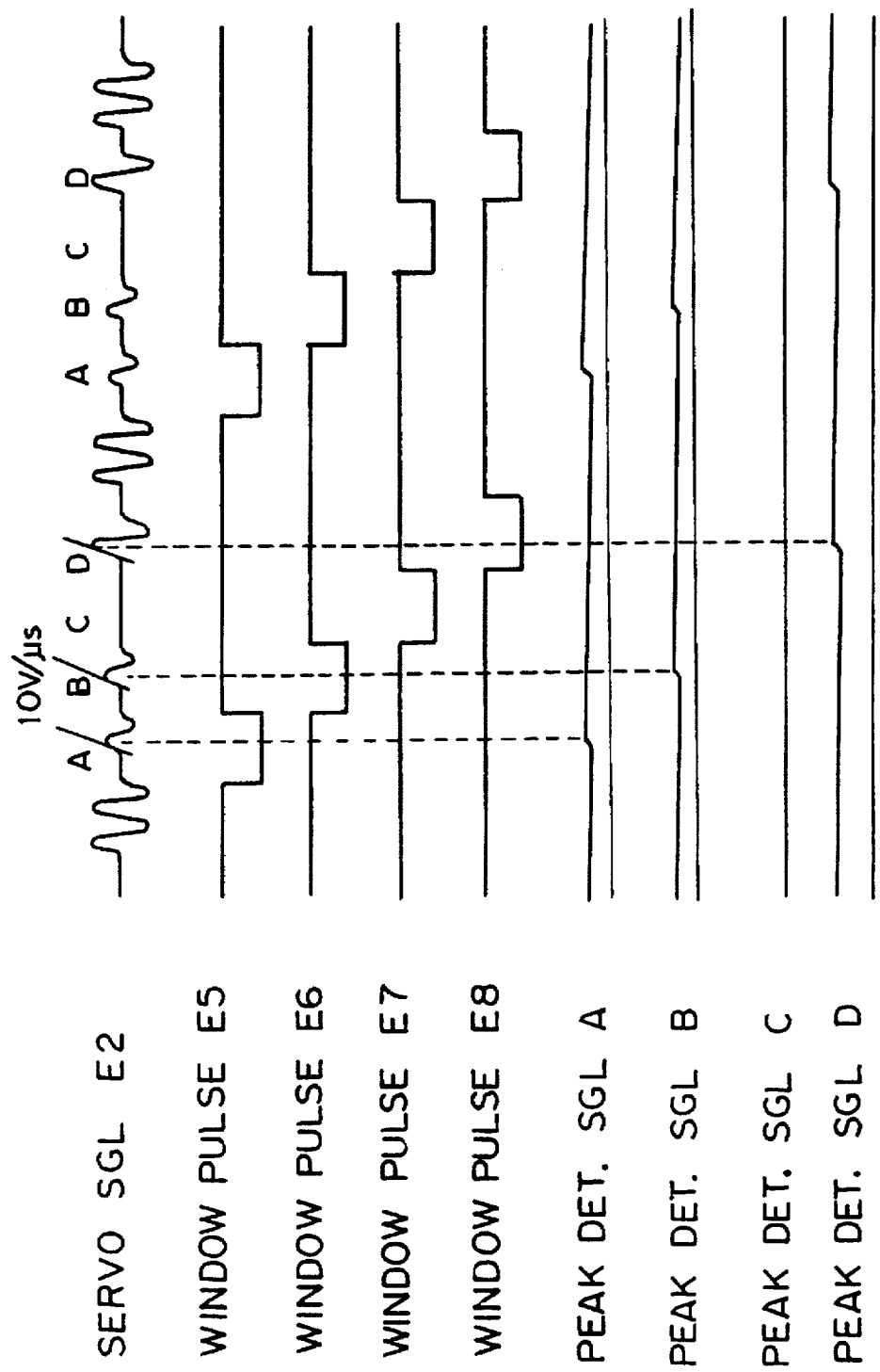
FIG. 5 is a timing chart for explaining the operation of the position signal demodulating circuit shown in FIG. 3.

FIG. 5 shows a timing chart representing the operation of the position signal demodulating circuit 30.

Referring to FIG. 5, the signal waveform obtained when the servo head 12 is located at the position of the cylinder CY2 shown in FIG. 4 is considered as the servo signal E2. The position signal demodulating circuit 30 receives the servo signal E2 and the window pulses E5 to E8 generated based on the synchronization signal and, using a peak detecting circuit (not shown), detects peak detection signals A, B, C and D between two adjacent synchronization patterns in the servo signal E2.

The position signal demodulating circuit 30 uses the peak detection signals A to D thus detected based on the window pulses E5 to E8 and a reference level signal R (see FIG. 6) and produces two kinds of position signals POSN and POSQ as the position signal E9. The position signals POSN and POSQ are expressed as follows:

$$[POSN]=[A]-[B]+[R]$$

$$[POSQ]=[C]-[D]+[R]$$

Figure 6:
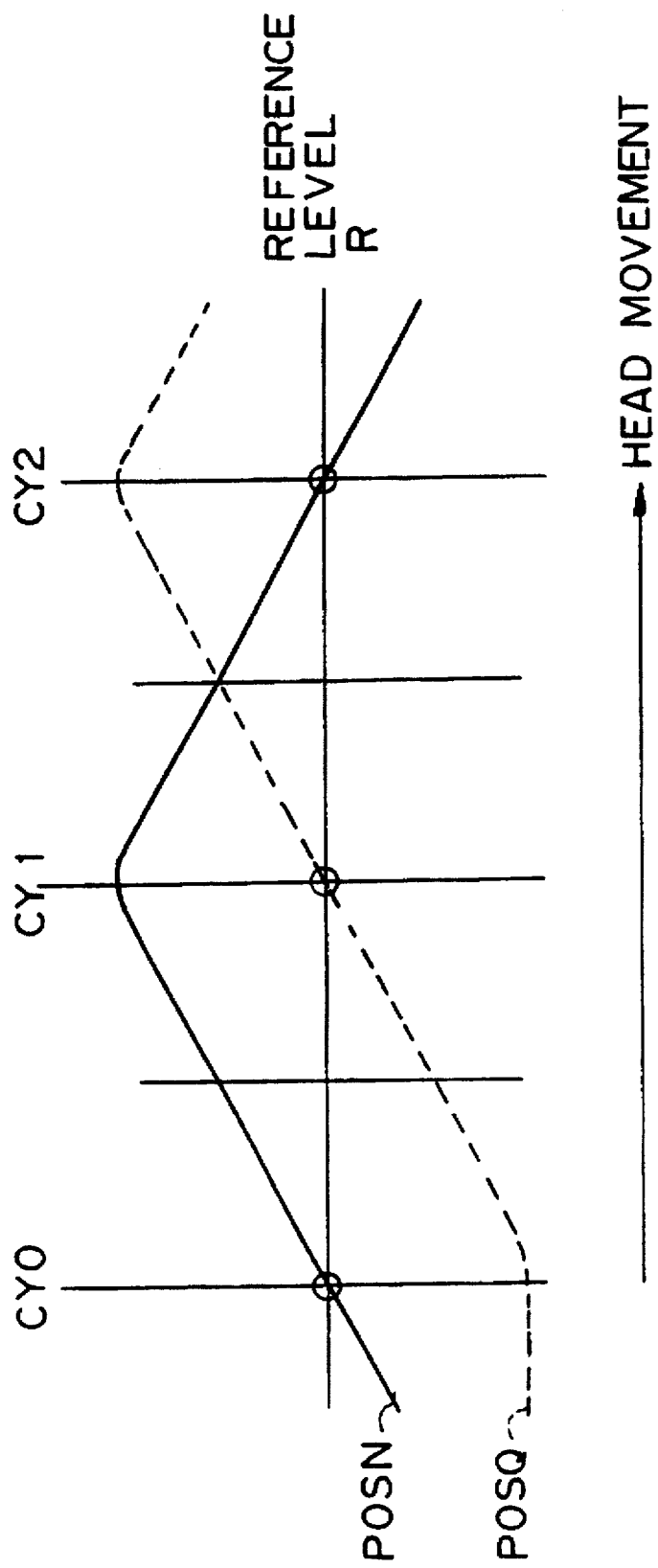
FIG. 6 is an explanatory view of the position signals generated from the position signal demodulating circuit.

FIG. 6 shows changes of the position signals POSN and POSQ relative to the movement of constant speed of the servo head. The movement speed of the head is determined by dividing one track pitch by a period of the crossing of the position signal POSN, POSQ relative to the reference level R. Also, the head positioning control can be carried out by generating a track crossing pulse at every period of the crossing and thus subtracting an access difference between the present track and a target track.

The position signal E9 consisting of the two kinds of position signals POSN and POSQ demodulated in the position signal demodulating circuit 30 is fed to the servo circuit 32. The servo circuit 32 outputs the drive signal E10 to the voice coil motor 34 and thus causes the voice coil motor 34 to move the servo head 12 together with other heads such as a data head to a target position designated by the processor 22. Namely, the servo circuit 32 effects the position servo control for positioning the heads to the target position.

On the other hand, the servo signal E2 amplified by the AGC amplifying circuit 28 is fed to the synchronization signal demodulating circuit 16, which demodulates the synchronization signal E3 from the synchronization patterns in the synchronization signal E2.

FIG. 7 illustrates the synchronization signal demodulating circuit 16 shown in FIG. 3, and FIG. 8 shows a timing chart representing the operation thereof.

Referring to FIGS. 7 and 8, the servo signal E2 from the AGC amplifying circuit 28 is fed to a comparator 36 in which a reference voltage Vref is set. The comparator 36 compares the servo signal E2 with the reference voltage Vref. When the servo signal E2 exceeds the reference voltage Vref, the comparator 36 produces a comparison output of "H" level. The output of the comparator 36 is input to a monostable multivibrator (MSMV) 38, which is triggered at a rise of the comparison output and thus produces a pulse output of "L" level for a constant time at the output QX. The output (QX) of the MSMV 38 is fed via an OR gate 40 to a monostable multivibrator 42. The MSMV 42 is triggered at a first rise of two successive pulses in the output of the MSMV 38 and thus generates a window signal of "L" level for a constant time, which is approximately one cycle of the synchronization pattern in the synchronization signal E2.

The inverted output QX of the MSMV 42 is fed back to the OR gate 40. Since the "Q" output of the MSMV 42 (i.e., window signal) is first at "H" level, the OR gate 40 passes the first "L" level pulse output from the MSMV 38 based on the servo patterns. However, when the MSMV 42 is triggered to thereby generate the "Q" output of "L" level, the OR gate 40 prohibits a pass of the subsequent second "L" level pulse obtained by the MSMV 38. Namely, the MSMV 42 is triggered only by the first "L" level pulse of the two "L" level pulses in the output of the MSMV 38 obtained from the synchronization patterns.

The "Q" output of the MSMV 42 (window signal) together with the output (QX) of the MSMV 38 is input to an OR gate 44. Accordingly, the OR gate 44 produces a logical sum of the "L" level window signal from the MSMV 42 and the "L" level pulse from the MSMV 38 to thereby output a synchronization signal E3 in synchronization with one rotation of the disc.

The output of the OR gate 44 is fed to an OR gate 46 provided in the last stage, which receives a lock-to-servo (LTSV) signal Ell from the processor 22 (see FIG. 3) via an inverter 48. Accordingly, when the LTSV signal Ell is made "H" level, the output of the inverter 48 is made "L" level and thus the OR gate 46 is made effective to permit the synchronization signal E3 to be output to the outside. The LTSV signal E11 is made "H" level in a predetermined time after the rotational speed of the disc driven by the spindle motor 26 is increased by a power-ON start and then reaches a regular speed (in the present example, 4340 r.p.m.) and thus a return-to-zero (RTZ) processing is started. The predetermined time is defined by a constant time in which the servo head 12 reaches a data region on the servo disc 10.

Referring to the timing chart of FIG. 8, a state is shown in which a spike noise appears between the synchronization patterns in the servo signal E2. Since the level of the spike noise is above the reference level Vref, a comparison output due to the spike noise appears in the output of the comparator 36. Accordingly, the output of the MSMV 38 is generated based on the comparison output by the spike noise and the setting of the window signal is carried out. As a result, the synchronization signal E3 contains a synchronization signal erroneously detected due to the spike noise.

Referring to FIG. 3 again, the synchronization signal E3 demodulated in the synchronization signal demodulating circuit 16 is fed to a gate circuit 20.

Figure 9:
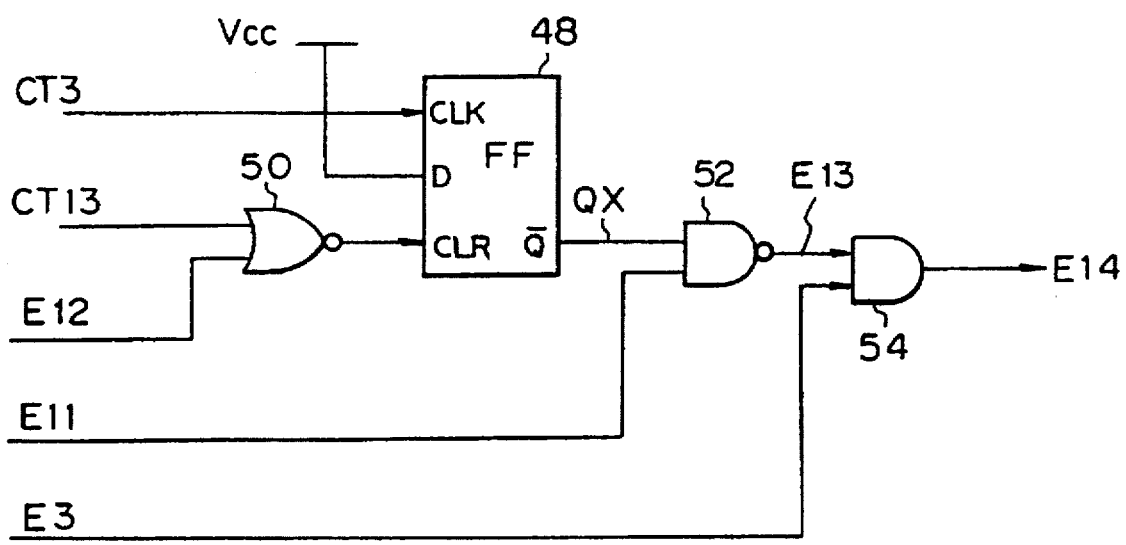
FIG. 9 is a circuit diagram illustrating the gate circuit shown in FIG. 3.
Figure 10:
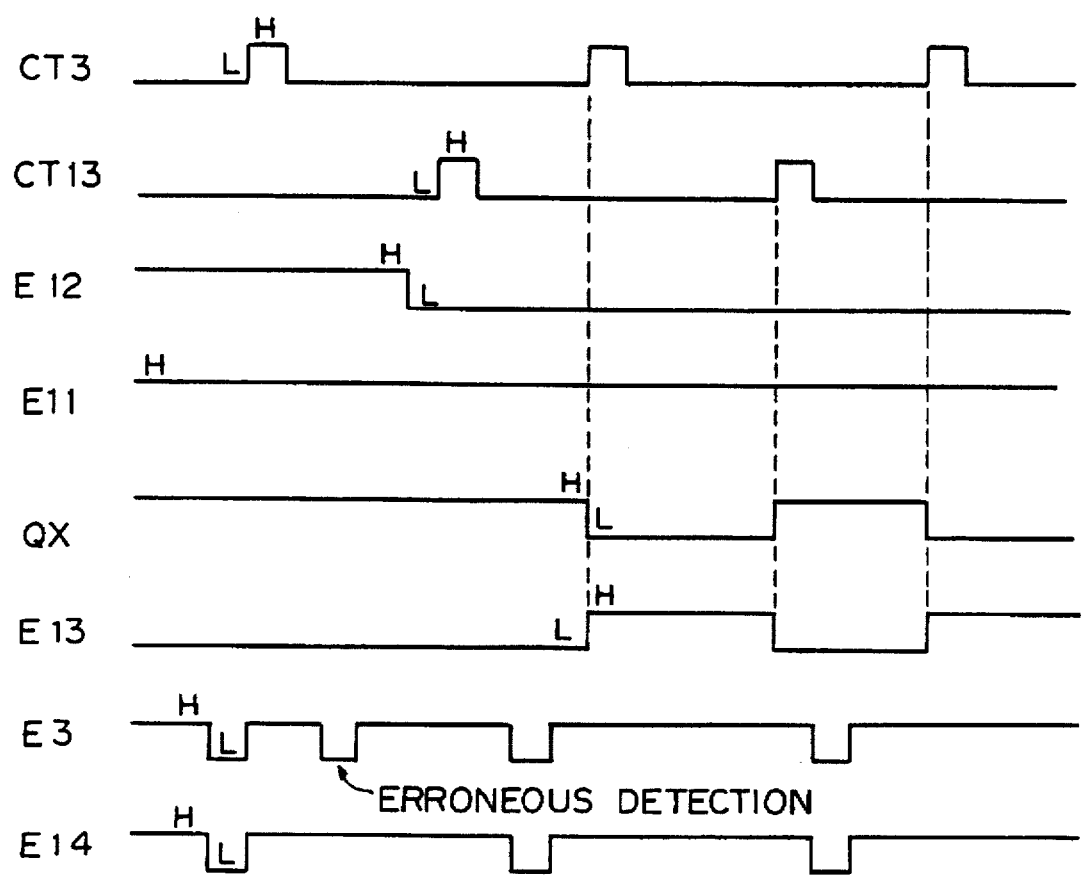
FIG. 10 is a timing chart for explaining the operation of the gate circuit of FIG. 9.

FIG. 9 illustrates the gate circuit 20 shown in FIG. 3, and FIG. 10 shows a timing chart representing the operation thereof.

Referring to FIGS. 9 and 10, a third count signal CT3 output from a counter circuit (explained later) in the PLL circuit unit 18 is input to a clock terminal CLK of a D-type flip-flop 48. Also, a thirteenth count signal CT13 output from the counter circuit in the PLL circuit unit 18 is input to one input end of an NOR gate 50, which receives an inverted signal (*GLTSV signal El2) of a gated LTSV signal from the processor 22 at another input end. The *GLTSV signal El2 is made "L" level when the servo head 12 is positioned on the zero cylinder, i.e., brought to an on-track state, by the RTZ processing after the rotational speed of the disc reaches the regular speed (4340 r.p.m.).

The output of the NOR gate 50 is input to a clear terminal CLR of the D-type flip-flop 48. A data terminal D of the D-type flip-flop 48 is fixed to "H" level pulled up to the power supply voltage Vcc. The output (QX) of the D-type flip-flop 48 is fed to one input end of a NAND gate 52, which receives the LTSV signal Ell at another input end. As previously explained, the LTSV signal Ell is made "H" level in a predetermined time after the rotational speed of the disc reaches the regular speed. The output of the NAND gate 52 forms a window signal E13, which is input to an OR gate 54 together with the synchronization signal E3. The OR gate 54 outputs a synchronization signal E14.

Referring to FIG. 3 again, the synchronization signal E14 output from the gate circuit 20 is fed to the PLL circuit unit 18.

Figure 11:
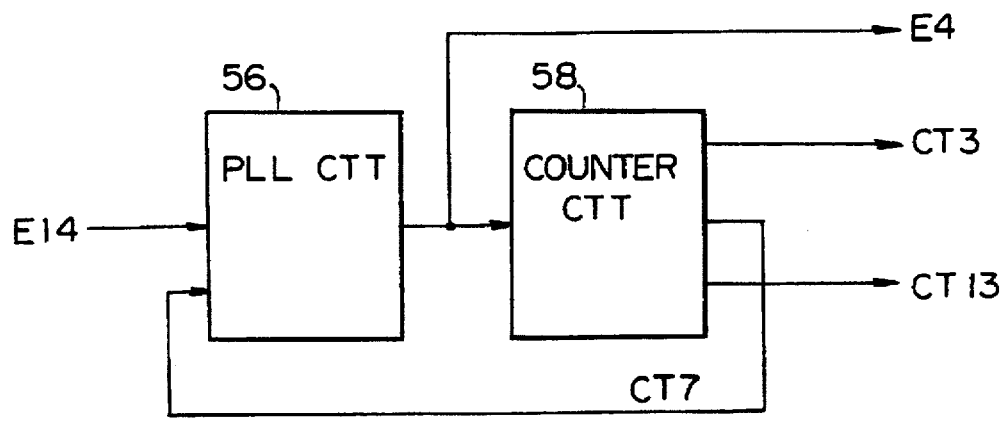
FIG. 11 is a block diagram illustrating the PLL circuit unit shown in FIG. 3.

FIG. 11 illustrates the PLL circuit unit 18, which is provided with a PLL circuit 56 and a counter circuit 58.

In FIG. 11, the PLL circuit 56 receives the synchronization signal E14 and a seventh count signal CT7 output from the counter circuit 58. The oscillation output of the PLL circuit 56 is fed to the processor 22 (see FIG. 3) as a clock signal E4 with a predetermined frequency (in the present example, 18 MHz) in synchronization with the synchronization signal E14. On the other hand, the counter circuit 58 supplies the gate circuit 20 (see FIG. 9) with the third count signal CT3 and the thirteenth count signal CT13 and thus causes the gate circuit 20 to produce the window signal E13 for removal of an erroneously demodulated synchronization signal.

Figure 12:
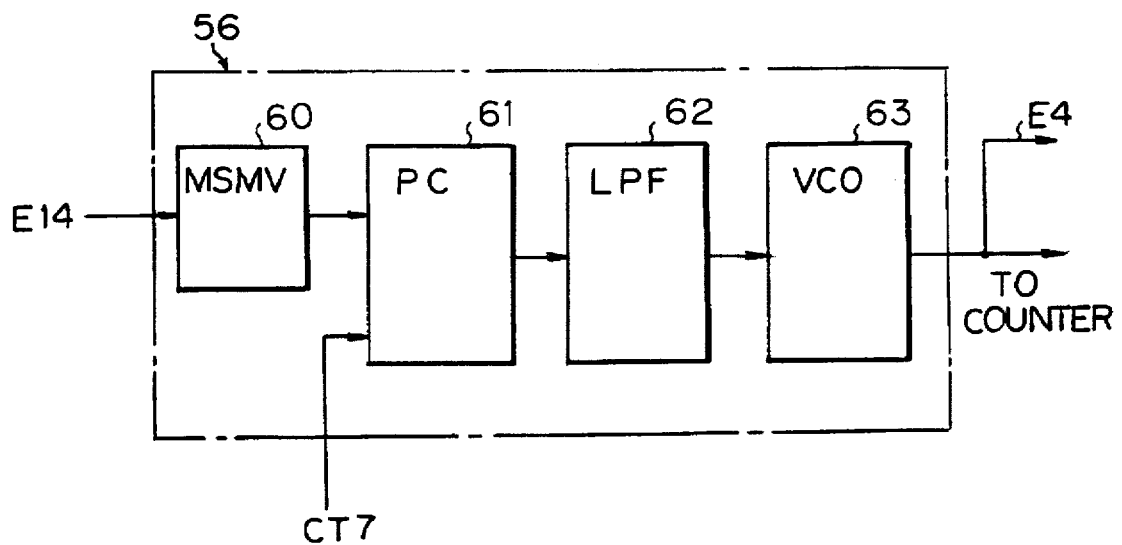
FIG. 12 is a circuit diagram illustrating the PLL circuit shown in FIG. 11.

FIG. 12 illustrates the PLL circuit 56.

In FIG. 12, the PLL circuit 56 includes a monostable multivibrator (MSMV) 60, a phase comparator (PC) 61, an integrator 62 using a low pass filter (LPF), and a voltage controlled oscillator (VCO) 63. The phase comparator 61 receives the synchronization signal E14 input via the MSMV 60 and the seventh count signal CT7 output from the counter circuit 58 (see FIG. 11), and effects a phase control of the oscillation clocks from the VCO 63 such that a phase difference between the output pulse of the MSMV 60 and the seventh count signal CT7 is made zero.

Figure 13:
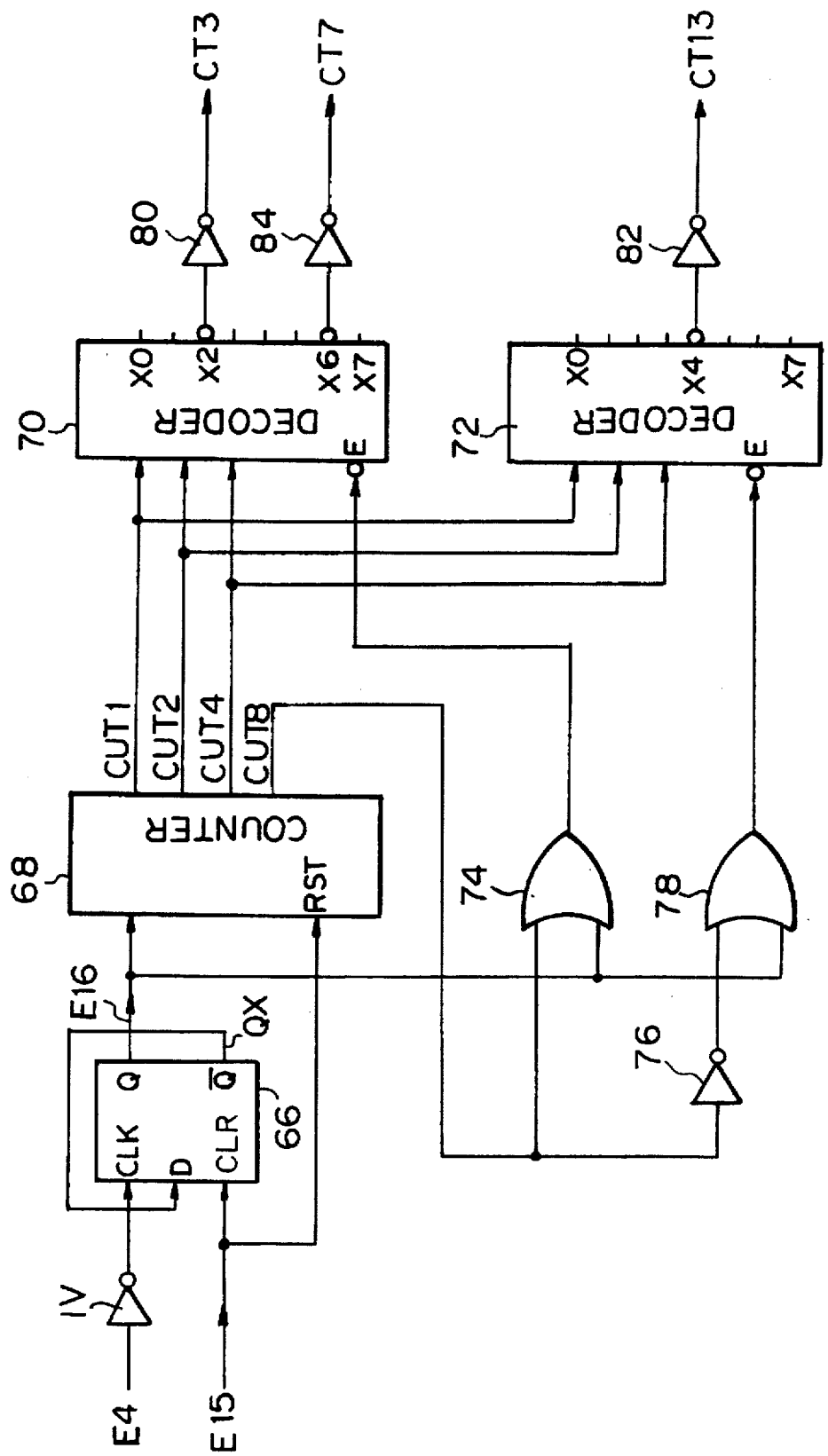
FIG. 13 is a circuit diagram illustrating the counter circuit shown in FIG. 11.

FIG. 13 illustrates a constitution of the counter circuit 58, and FIG. 14 shows a timing chart representing the operation thereof.

In FIG. 13, reference 66 denotes a D-type flip-flop, which frequency-divides into a half the clock signal E4 input from the PLL circuit 56 via an inverter IV. The D-type flip-flop 66 is cleared by a power-ON start signal E15 which is obtained as a "L" level signal at a power-ON start.

The clock signal E16 frequency-divided by the D-type flip-flop 66 into a half is fed to a counter 68. The counter 68 includes a binary counter and generates four count outputs CUT1, CUT2, CUT4 and CUT8 having weights of "1", "2", "4" and "8" in a decimal expression, respectively.

In the embodiment of FIG. 13, the clock signal E4 from the PLL circuit 56 includes thirty-two clock pulses within one period (T) defined by the synchronization signal (see FIG. 14). Accordingly, the "Q" output of the D-type flip-flop 66 (½ frequency-divided clock signal E16) includes sixteen clock pulses within one period (T). The counter 68 counts the sixteen clock pulses (signal E16) in one period (T) defined by the synchronization signal, and generates the count outputs CUT1, CUT2, CUT4 and CUT8 each having the respective weight, as shown in FIG. 14.

The count outputs CUT1, CUT2 and CUT4 are input in a parallel manner to decoders 70 and 72 provided in the subsequent stage. On the other hand, the count output CUT8 is fed an OR gate 74 to an enable terminal E of the decoder 70, and fed via an inverter 76 and an OR gate 78 to an enable terminal E of the decoder 72.

When the counted value in the counter 68 is within 1 to 8, the count output CUT8 is at "L" level (see FIG. 14). Accordingly, the OR gate 74 is made effective and the OR gate 78 is made ineffective. As a result, the clock signal E16 from the D-type flip-flop 66 is fed via the OR gate 74 to the enable terminal E of the decoder 70 and thus the decoder 70 functions to generate its decode output of the corresponding counted value converted into the decimal digit from the binary digit. On the other hand, when the counted value in the counter 68 is within 9 to 16, the count output CUT8 is at "H" level (see FIG. 14). Accordingly, the OR gate 74 is made ineffective and the OR gate 78 is made effective. As a result, the clock signal E16 is fed via the OR gate 78 to the enable terminal E of the decoder 72 and thus the decoder 72 generates its decode output of the corresponding counted value converted into the decimal digit from the binary digit.

The output at a decode terminal X2 corresponding to the third count output of the decoder 70 which generates the decode output corresponding to the first half (1 to 8) of the counted values is fed via an inverter 80 to the gate circuit 20 shown in FIG. 9 (third count signal CT3). On the other hand, the output at a decode terminal X4 corresponding to the thirteenth count output of the decoder 72 which generates the decode output corresponding to the second half (9 to 16) of the counted values is fed via an inverter 82 to the gate circuit 20 (thirteenth count signal CT13). Also, the output at a decode terminal X6 corresponding to the seventh count output of the decoder 70 is fed via an inverter 84 to the phase comparator 61 in the PLL circuit 56 shown in FIG. 12 (seventh count signal CT7).

The window signal E13 (see FIG. 10) is produced by the NOR gate 50, the D-type flip-flop 48 and the NAND gate 52 (see FIG. 9) in synchronization with the rise to "H" level of the third count signal CT3 (see FIG. 14) generated in synchronization with the third clock in the sixteen clock pulses (signal E16) obtained in one period (T) defined by the synchronization signal and the rise to "H" level of the thirteenth count signal CT13 (see FIG. 14) generated in synchronization with the thirteenth clock in the sixteen clock pulses (signal E16).

FIG. 15 shows a timing chart representing the operation of the PLL circuit 56 of FIG. 12.

Referring to FIG. 15, the seventh count signal CT7 is produced by the counter circuit 58 (see FIG. 13) in synchronization with the seventh clock in the sixteen clock pulses (signal E16) obtained in one period (T) defined by the synchronization signal.

The monostable multivibrator 60 (see FIG. 12) receives the synchronization signal E14 and is triggered by the rise to "H" level of the synchronization signal E14 to thereby generate a pulse output with a pulse width T1 (see FIG. 15) corresponding to seven clocks in the sixteen clock pulses (signal E16). Accordingly, the phase comparator 61 compares a phase at the rise to "H" level of the seventh count signal CT7 with that at the fall to "L" level of the output pulse of the MSMV 60, and effects the phase control of the oscillation clocks from the VCO 63 such that the phase difference therebetween coincides with a reference phase of the output pulse of the MSMV 60.

Referring to FIG. 3 again, the clock signal E4 generated based on the synchronization signal E14 in the PLL circuit unit 18 is fed to the processor 22. The clock signal E4 is used as a basic signal in the data writing, or used as a reference clock pulse for data separation for taking a data pulse from the regenerative signal in the data reading. Also, the processor 22 sets a target position for the servo circuit 32 in the head positioning unit 24 under the seek control from a magnetic disc control unit (not shown). At this time, the servo circuit 32 outputs the drive signal E10 to the voice coil motor 34 such that an error between the demodulated position signal E9 and a signal corresponding to the target position is made zero, and thus effects the position servo control for positioning the head to the target position.

Furthermore, the processor 22 supplies the gate circuit 20 characterizing the present invention with the LTSV signal E11 and the *GLTSV signal E12 for making the gate function effective.

Next, the operation of the apparatus of FIG. 3 will be explained with reference to the flow charts shown in FIGS. 16a and 16b. The illustrated processings are executed when the disc-drive apparatus is powered ON (i.e., at a power-ON start).

First, at step S1, the spindle motor 26 is started. At step S2, the control judges whether the rotational speed of the disc driven by the spindle motor 26 reaches the regular speed (YES) or not (NO). If the judgment indicates NO, the control proceeds to step S3 and judges whether a predetermined time has elapsed (YES) or not (NO). If the judgment at step S3 indicates YES, the control proceeds to "ALARM ROUTINE" and, if the judgment indicates NO, the control returns to step S2.

If the judgment at step S2 indicates YES, the control proceeds to step S4 and starts the RTZ processing for positioning the servo head 12 on a zero cylinder (e.g., outermost cylinder in the disc mechanism 14). At the next step S5, the control awaits a lapse of a constant time in which the servo head 12 reaches a data region on the servo disc 10, and proceeds to step S6. At step S6, the control (processor 22) makes the LTSV signal E11 "H" level, which is fed to the synchronization signal demodulating circuit 16 and the gate circuit 20. Thus, the synchronization signal demodulating circuit 16 begins to demodulate the synchronization signal E3 based on the servo signal E2.

At step S7, the control executes the RTZ processing and, at the next step S8, the control judges whether the servo head 12 has been positioned by the RTZ processing on the zero cylinder, i.e., brought to the on-track state (YES) or not (NO). If the judgment at step S8 indicates NO, the control proceeds to step S9 and judges whether the number of re-try of the RTZ processing reaches a predetermined number "m" (YES) or not (NO). If the judgment at step S9 indicates YES, the control proceeds to "ALARM ROUTINE" and, if the judgment indicates NO, the control returns to step S4.

If the judgment at step S8 indicates YES, the control proceeds to step S10, where the processor 22 makes the *GLTSV signal E12 "L" level, which is fed to the gate circuit 20. Thus, the gate circuit 20 shown in FIG. 9 is made effective and thus starts generating the window signal E13 for removal of an erroneously detected synchronization signal. Therefore, even if an erroneous synchronization signal due to a spike noise is contained in the synchronization signal E3 demodulated by the synchronization signal demodulating circuit 16, it can be removed by the window signal E13 produced in the gate circuit 20. As a result, only the precisely detected synchronization signal E14 is fed to the PLL circuit unit 18.

After the gate circuit 20 starts its gate operation at step S10, the control proceeds to step S11 and executes various control routines. At the next step S12, the control judges whether any seek error has been detected during the execution of the various control routines (YES) or not (NO). If the judgment at step S12 indicates NO, the control returns to step S11 and, if the judgment indicates YES, the control proceeds to step S13. At step S13, the processor 22 makes the *GLTSV signal E12 "H" level and then returns to step S4.

Although, in the above processings in FIGS. 16a and 16b, the processor 22 makes effective the window signal E13 in the gate circuit 20 based on the detection of the on-track to the zero cylinder by the RTZ processing, it is not restrictive. For example, a modification may be provided in which the processor 22 detects that the position signal demodulating circuit 30 has demodulated the two kinds of position signals POSN and POSQ shown in FIG. 6 during the RTZ processing, and makes the *GLTSV signal E12 "L" level to thereby make effective the window signal E13 in the gate circuit 20.

As to the seek error at step S12, a modified processing may be provided in which, when the position signal demodulating circuit 30 cannot demodulate the position signal E9 and thus the servo circuit 32 requests the processor 22 to effect the RTZ processing, the control returns to step S4 via step S13.

Also, another modified processing as to the seek error at step S12 may be provided in which, when a time over error due to a mechanical erroneous operation occurs in the position control by the servo circuit 32 during the seek operation and thus the servo head 12 is returned to the outermost zero cylinder, the control returns to step S4 via step S13.

Although, in the above embodiment, the window signal is generated at a time between the third pulse and the thirteenth pulse among the sixteen clock pulses (E16) generated within one period T defined by the synchronization signal and thus the gate circuit 20 prohibits the supply of the demodulated synchronization signal E3 from the synchronization signal demodulating circuit 16 to the PLL circuit unit 18, it is not restrictive. The window signal can be arbitrarily selected as long as the generation timing thereof lies between the synchronization patterns in the servo signal E2.

Although the present invention has been disclosed and described by way of one embodiment, it is apparent to those skilled in the art that other embodiments and modifications of the present invention are possible without departing from the spirit or essential features thereof.

We claim:

1. An apparatus for reproducing a synchronization signal in a disc storage system, comprising:

a disc mechanism including a plurality of information storage discs in one of which a particular servo pattern is recorded, and a corresponding plurality of reproducing heads, one of the reproducing heads reading the servo pattern from the corresponding information storage disc to thereby output a servo signal, the servo pattern including a first servo pattern and a second servo pattern following after the first servo pattern and the servo signal including first and second servo signals corresponding to the first and second servo patterns, respectively;

synchronization signal demodulating means, responsive to the servo signal from the disc mechanism, for demodulating the synchronization signal in synchronization with a rotation of the information storage discs, wherein the synchronization signal demodulating means includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

synchronization clock generating means for generating a clock signal with a particular frequency in synchronization with the synchronization signal, said clock signal being used for positioning said reproducing heads; and gate means, operatively connected between the synchronization signal demodulating means and the synchronization clock generating means, for prohibiting transmission of the synchronization signal from the synchronization signal demodulating means to the synchronization clock generating means for a particular period, and for filtering spike noise.

2. An apparatus as set forth in claim 1, wherein the particular period is defined by a period covering from when a synchronization signal is obtained by the synchronization signal demodulating means until a subsequent synchronization signal is obtained thereby.

3. An apparatus for reproducing a synchronization signal in a disc storage system, comprising:

a disc mechanism including a servo disc in which at least one particular servo pattern is recorded, and a servo head for reading the servo pattern from the servo disc to thereby output a servo signal, the servo pattern including a first servo pattern and a second servo pattern following after the first servo pattern and the servo signal including first and second servo signals corresponding to the first and second servo patterns;

synchronization signal demodulating means, responsive to the first and second servo signal from the disc mechanism, for demodulating the synchronization signal in synchronization with a rotation of the servo disc, wherein the synchronization signal demodulating means includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

synchronization clock generating means for generating a clock signal with a particular frequency in synchronization with the synchronization signal;

gate means, operatively connected between the synchronization signal demodulating means and the synchronization clock generating means, for prohibiting transmission of the synchronization signal from the synchronization signal demodulating means to the synchronization clock generating means for a particular period, and for filtering spike noise;

head positioning means for generating a position signal indicating a position of the servo head based on the servo signal from the disc mechanism and window signals from the synchronization clock generating means and, based on the position signal, controlling a drive motor provided in the disc mechanism to cause the servo head to follow a designated target position; and control means, responsive to the clock signal transmitted from the synchronization clock generating means, for generating control signals for at least one of enabling and disabling the gate means, and controlling the head positioning means and the synchronization signal demodulating means.

4. An apparatus as set forth in claim 3, wherein the particular period is defined by a period covering from when the synchronization signal is obtained by the synchronization signal demodulating means until a subsequent synchronization signal is obtained thereby.

5. An apparatus as set forth in claim 4, wherein the synchronization clock generating means comprises:

a phase-locked loop circuit, responsive to the synchronization signal transmitted via the gate means from the synchronization signal demodulating means, effecting a phase control of the clock signal oscillating at the particular frequency, on the basis of the synchronization signal; and a counter circuit repeatedly counting a particular plurality of clocks generated by the phase-locked loop circuit at every generation of the synchronization signal and supplying the gate means with a first count output of a particular number in a first half of the repeatedly counted values and a second count output of another particular number in a second half thereof, to thereby cause the gate means to set the particular period.

6. An apparatus as set forth in claim 5, wherein the number of the particular plurality of clocks is sixteen, and the first count output and the second count output are selected to be a count value of three and a count value of thirteen, respectively.

7. An apparatus as set forth in claim 3, wherein the control means enables the gate means when it detects that a rotational speed of the disc has reached a particular speed after a power-ON start and thereafter the head has been positioned by the head positioning means on a zero cylinder.

8. An apparatus as set forth in claim 3, wherein the control means enables the gate means when it detects that a rotational speed of the disc has reached a particular speed after a power-ON start and thereafter, while the head is being positioned by the head positioning means on a zero cylinder, the position signal has been demodulated from the servo signal.

9. An apparatus as set forth in claim 3, wherein the control means enables the gate means when the head positioning means cannot demodulate the position signal in steady operation and thus the control means effects a control for positioning the head on a zero cylinder.

10. An apparatus as set forth in claim 3, wherein the control means enables the gate means when the head movement by the head positioning means is not in time due to a mechanical erroneous operation in steady operation and thus the control means effects a control for positioning the head on a zero cylinder.

11. An apparatus as set forth in claim 3, wherein the disc mechanism is a magnetic disc mechanism.

12. An apparatus for reproducing a synchronization signal in a disc storage system, comprising:

a disc mechanism including a servo disc in which at least one particular servo pattern is recorded, and a servo head for reading the servo pattern from the servo disc to output a servo signal, the servo pattern including a first servo pattern and a second servo pattern following after the first servo pattern and the servo signal including first and second servo signals corresponding to the first and second servo patterns, respectively;

a synchronization signal demodulating circuit, responsive to the servo signal from the disc mechanism, demodulating a synchronization signal in synchronization with a rotation of the servo disc, wherein the synchronization signal demodulating circuit includes:

a first monostable multivibrator outputting first and second pulses triggered by the first and second servo signals respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

a synchronization clock generating circuit generating a clock signal with a particular frequency in synchronization with the synchronization signal;

a gate circuit, operatively connected between the synchronization signal demodulating circuit and the synchronization clock generating circuit, prohibiting transmission of the synchronization signal from the synchronization signal demodulating circuit to the synchronization clock generating circuit for a particular period, and filtering spike noise;

a head positioning circuit generating a position signal indicating a position of the servo head based on the servo signal from the disc mechanism and window signals, from the synchronization clock generating circuit and, based on the position signal, controlling a drive motor provided in the disc mechanism to cause the servo head to follow a designated target position; and a control device, responsive to the clock signal transmitted from the synchronization clock generating circuit, generating control signals for enabling or disabling the gate circuit, and controlling the head positioning circuit and the synchronization signal demodulating circuit.

13. An apparatus as set forth in claim 12, wherein the particular period is defined by a period covering from when the synchronization signal is obtained by the synchronization signal demodulating circuit until a subsequent synchronization signal is obtained thereby.

14. An apparatus as set forth in claim 13, wherein the particular frequency is 18 MHz.

15. An apparatus as set forth in claim 14, wherein the disc mechanism is a magnetic disc mechanism.

16. An apparatus as set forth in claim 13, wherein the synchronization clock generating circuit comprises:

a phase-locked loop circuit, responsive to the synchronization signal transmitted via the gate circuit from the synchronization signal demodulating circuit, effecting a phase control of the clock signal oscillating at the particular frequency, on the basis of the synchronization signal; and a counter circuit repeatedly counting sixteen clocks generated by the pace-locked loop circuit at every generation of the synchronization signal and supplying the gate circuit with a first count output of a value corresponding to three clocks in a first half of the repeatedly counted values and a second count output of a value corresponding to thirteen clocks in a second half thereof, to thereby cause the gate circuit to set the particular period.

17. An apparatus for reproducing a synchronization signal in a magnetic disc storage system, comprising:

a magnetic disc mechanism including a servo disc in which at least one particular servo pattern is recorded, a servo head for reading the servo pattern from the servo disc to output a servo signal, the servo pattern including a first servo pattern and a second servo pattern following after the first servo pattern and the servo signal including first and second servo signals corresponding to the first and second servo patterns, respectively, and a drive motor for driving the servo head to follow a designated target position;

a synchronization signal demodulating circuit, responsive to the servo signal from the magnetic disc mechanism, demodulating a synchronization signal in synchronization with a rotation of the servo disc, wherein the synchronization signal demodulating circuit includes:

a first monostable multivibrator outputting first and second pulses triggered by the first and second servo signals respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

a synchronization clock generating circuit generating a clock signal with a particular frequency in synchronization with the synchronization signal;

a gate circuit, operatively connected between the synchronization signal demodulating circuit and the synchronization clock generating circuit, filtering spike noise;

a head positioning circuit generating a position signal indicating a position of the servo head based on the servo signal from the disc mechanism and window signals from the synchronization clock generating circuit and, based on the position signal, controlling the drive motor to cause the servo head to follow the designated target position; and a processor, responsive to the clock signal transmitted from the synchronization clock generating circuit, generating control signals for at least one of enabling and disabling the gate circuit, and controlling the head positioning circuit and the synchronization signal demodulating circuit, wherein the gate circuit prohibits transmission of the synchronization signal from the synchronization signal demodulating circuit to the synchronization clock generating circuit for a period covering from when a synchronization signal is obtained by the synchronization signal demodulating circuit until a subsequent synchronization signal is obtained thereby.

18. A method of reproducing a synchronization signal in a system having a disc mechanism, which includes at least one servo disc and generates a servo signal based on information, including a servo pattern from the servo disc, the method comprising the steps of:

reading the servo pattern information from the servo disc and generating a corresponding servo signal, the servo pattern including a first servo pattern and a second servo pattern following after the first servo pattern and the servo signal including first and second servo signals corresponding to the first and second servo patterns, respectively;

demodulating a synchronization signal based on the servo signal from the disc mechanism utilizing a synchronization signal demodulating circuit including:

a first monostable multivibrator outputting first and second pulses triggered by the first and second servo signals respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

filtering spike noise utilizing a gate circuit;

making the demodulated synchronization signal at least one of enabling and disabling according to control information generated under a particular condition; and generating a synchronization clock signal in synchronization with the demodulated synchronization signal when the demodulated synchronization signal is enabled, to thereby reproduce the synchronization signal.

19. A method as set forth in claim 18, further comprising a step of generating control information for making the demodulated synchronization signal effective after a rotational speed of the servo disc reaches a particular speed and thus a processing for positioning the corresponding servo head on a designated cylinder in the disc mechanism is started.

20. A method as set forth in claim 19, wherein the step of demodulating a synchronization signal comprises a step of starting the demodulating operation after a rotational speed of the servo disc reaches the particular speed and thus a processing for positioning the corresponding servo head on a designated cylinder in the disc mechanism is started.

21. A method as set forth in claim 19, further comprising a step of effecting a phase-locked loop control of the generated synchronization clock signal.

22. A method as set forth in claim 21, further comprising a step of repeatedly counting the phase-locked loop controlled synchronization clock signal at every generation thereof and, based on a result of the counting, generating part of the control information.

23. An apparatus for reproducing a synchronization signal in a disc storage system, comprising:

a disc mechanism including a plurality of information storage discs on one of which is recorded a particular servo pattern, comprising a synchronization pattern and a peak detection pattern, and a corresponding plurality of reproducing heads, one of the reproducing heads reading the particular servo pattern from the corresponding information storage disc to thereby output a corresponding, particular servo signal, comprising a synchronization signal and a peak detection signal respectively corresponding to the synchronization pattern and the peak detection pattern read from the disc, and wherein the synchronization pattern comprises a first servo pattern and a second servo pattern, following after the first servo pattern, and the particular servo signal comprises a synchronization signal corresponding to the synchronization pattern, the synchronization signal including first and second servo signals respectively corresponding to the first and second servo patterns;

synchronization signal demodulating means, responsive to the particular servo signal from the disc mechanism, for demodulating the synchronization signal in synchronization with a rotation of the information storage discs when the two peaks contained in the synchronization pattern are detected:

a first monostable multivibrator outputting first and second pulses triggered by the first and second servo signals respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

synchronization clock generating means for generating a clock signal with a particular frequency in synchronization with the synchronization signal, said clock signal being used for positioning said reproducing heads; and gate means, operatively connected between the synchronization signal demodulating means and the synchronization clock generating means, for prohibiting transmission of the synchronization signal from the synchronization signal demodulating means to the synchronization clock generating means for a particular period corresponding to a time interval between a synchronization pattern and a subsequent synchronization pattern, and for filtering spike noise.

24. An apparatus as set forth in claim 23, wherein the particular period is defined by a period covering from when a synchronization signal is obtained by the synchronization signal demodulating means until a subsequent synchronization signal is obtained thereby.

25. An apparatus for reproducing a synchronization signal in a disc storage system, comprising:

a disc mechanism including a servo disc on which is recorded a particular servo pattern, comprising a synchronization pattern and a peak detection pattern, and a servo head reading the particular servo pattern from the servo disc to thereby output a corresponding, particular servo signal, comprising a synchronization signal and a peak detection signal respectively corresponding to the synchronization pattern and the peak detection pattern read from the disc, and wherein the synchronization pattern comprises a first servo pattern and a second servo pattern, following after the first servo pattern, and the particular servo signal comprises a synchronization signal corresponding to the synchronization pattern, the synchronization signal including first and second servo signals respectively corresponding to the first and second servo patterns;

synchronization signal demodulating means, responsive to the servo signal from the disc mechanism, for demodulating the synchronization signal in synchronization with a rotation of the servo disc when the two peaks contained in a respective synchronization pattern are detected, wherein the synchronization signal demodulating means includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

synchronization clock generating means for generating a clock signal with a particular frequency in synchronization with the synchronization signal;

gate means, operatively connected between the synchronization signal demodulating means and the synchronization clock generating means, for prohibiting transmission of the synchronization signal form the synchronization signal demodulating means to the synchronization clock generating means for a particular period corresponding to a time between a synchronization pattern and a subsequent synchronization pattern, and for filtering spike noise;

head positioning means for generating a position signal indicating a position of the servo head based on the servo signal from the disc mechanism and window signals from the synchronization clock generating means and, based on the position signal, controlling a drive motor provided in the disc mechanism to cause the servo head to follow a designated target position; and control means, responsive to the clock signal transmitted from the synchronization clock generating means, for generating clock signals for at least one of enabling and disabling the gate means, and controlling the head positioning means and the synchronization signal demodulating means.

26. An apparatus as set forth in claim 25, wherein the particular period is defined by a period covering from when the synchronization signal is obtained by the synchronization signal demodulating means until a subsequent synchronization signal is obtained thereby.

27. An apparatus as set forth in claim 26, wherein the synchronization clock generating means comprises:

a phase-locked loop circuit, responsive to the synchronization signal transmitted via the gate means from the synchronization signal demodulating means, effecting a phase control of the clock signal oscillating at the particular frequency, on the basis of the synchronization signal; and a counter circuit repeatedly counting a particular plurality of clocks generated by the phase-locked loop circuit at every generation of the synchronization signal and supplying the gate means with a first count output of a particular number in a first half of the repeatedly counted values and a second count output of another particular number in a second half thereof, to thereby cause the gate means to set the particular period.

28. An apparatus as set forth in claim 27, wherein the number of the particular plurality of clocks is sixteen, and the first count output and the second count output are selected to be a count value of three and a count value of thirteen, respectively.

29. An apparatus as set forth in claim 25, wherein the control means enables the gate means when it detects that a rotational speed of the disc has reached a particular speed after a power-ON start and thereafter the head has been positioned by the head positioning means on a zero cylinder.

30. An apparatus as set forth in claim 25, wherein the control means enables the gate means when it detects that a rotational speed of the disc has reached a particular speed after a power-ON start and thereafter, while the head is being positioned by the head positioning means on a zero cylinder, the position signal has been demodulated from the servo signal.

31. An apparatus as set forth in claim 25, wherein the control means enables the gate means when the head positioning means cannot demodulate the position signal in steady operation and thus the control means effects a control for positioning the head on a zero cylinder.

32. An apparatus as set forth in claim 25, wherein the control means enables the gate means when the head movement by the head positioning means is not in time due to a mechanical erroneous operation in steady operation and thus the control means effects a control for positioning the head on a zero cylinder.

33. An apparatus as set forth in claim 25, wherein the disc mechanism is a magnetic disc mechanism.

34. An apparatus for reproducing a synchronization signal in a disc storage system, comprising:

a disc mechanism including a servo disc on which is recorded a particular servo pattern comprising a synchronization pattern and a peak detection pattern and a servo head reading the particular servo pattern from the servo disc to output a corresponding, particular servo signal, comprising a synchronization signal and a peak detection signal respectively corresponding to the synchronization pattern and the peak detection pattern read frog the disc, and wherein the synchronization pattern comprises a first servo pattern and a second servo pattern, following after the first servo pattern, and the particular servo signal comprises a synchronization signal corresponding to the synchronization pattern, the synchronization signal including first and second servo signals respectively corresponding to the first and second servo patterns;

a synchronization signal demodulating circuit, responsive to the particular servo signal from the disc mechanism, demodulating the synchronization signal in synchronization with a rotation of the servo disc when the first and second servo patterns contained in the synchronization pattern are detected, wherein the synchronization signal demodulating circuit includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

a synchronization clock generating circuit generating a clock signal with a particular frequency in synchronization with the synchronization signal;

a gate circuit, operatively connected between the synchronization signal demodulating circuit and the synchronization clock generating circuit, prohibiting transmission of the synchronization signal from the synchronization signal demodulating circuit to the synchronization clock generating circuit for a particular period corresponding to a time interval between a synchronization pattern and a subsequent synchronization pattern, and filtering spike noise;

a head positioning circuit generating a position signal indicating a position of the servo head based on the servo signal from the disc mechanism and window signals from the synchronization clock generating circuit and, based on the position signal, controlling a drive motor provided in the disc mechanism to cause the servo head to follow a designated target position; and a control device, responsive to the clock signal transmitted from the synchronization clock generating circuit, generating control signals for enabling or disabling the gate circuit, and controlling the head positioning circuit and the synchronization signal demodulating circuit.

35. An apparatus as set forth in claim 34, wherein the particular period is defined by a period covering from when the synchronization signal is obtained by the synchronization signal demodulating circuit until a subsequent synchronization signal is obtained thereby.

36. An apparatus as set forth in claim 35, wherein the particular frequency is 18 MHz.

37. An apparatus as set forth in claim 36, wherein the disk mechanism is a magnetic disc mechanism.

38. An apparatus as set forth in claim 35, wherein the synchronization clock generating circuit comprises:

a phase-locked loop circuit, responsive to the synchronization signal transmitted via the gate circuit from the synchronization signal demodulating circuit, effecting a phase control of the clock signal oscillating at the particular frequency, on the basis of the synchronization signal; and a counter circuit repeatedly counting sixteen clocks generated by the phase-locked loop circuit at every generation of the synchronization signal and supplying the gate circuit with a first count output of a value corresponding to three clocks in a first half of the repeatedly counted values and a second count output of a value corresponding to thirteen clocks in a second half thereof, to thereby cause the gate circuit to set the particular period.

39. An apparatus for reproducing a synchronization signal in a magnetic disc storage system, comprising:

a magnetic disc mechanism including a servo disc on which is recorded a particular servo pattern, comprising a synchronization pattern and a peak detection pattern, and a servo head reading the servo pattern from the servo disc to output a corresponding, particular servo signal, and a drive motor for driving the servo head to follow a designated target position wherein the synchronization pattern comprises a first servo pattern and a second servo pattern, following after the first servo pattern, and the particular servo signal comprises a synchronization signal corresponding to the synchronization pattern, the synchronization signal including first and second servo signals respectively corresponding to the first and second servo patterns;

a synchronization signal demodulating circuit, responsive to the particular servo signal from the magnetic disc mechanism, demodulating the synchronization signal in synchronization with a rotation of the servo disc when the first and second servo patterns contained in the synchronization pattern are detected, wherein the synchronization signal demodulating circuit includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal and outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

a synchronization clock generating circuit generating a clock signal with a particular frequency in synchronization with the synchronization signal;

a gate circuit, operatively connected between the synchronization signal demodulating circuit and the synchronization clock generating circuit, filtering spike noise;

a head positioning circuit generating a position signal indicating a position of the servo head based on the servo signal from the disc mechanism and window signals from the synchronization clock generating circuit and, based on the position signal, controlling the drive motor to cause the servo head to follow the designated target position; and a processor, responsive to the clock signal transmitted from the synchronization clock generating circuit, generating signals for at least one of the enabling and disabling the gate circuit, and controlling the head positioning circuit and the synchronization signal demodulating circuit, wherein the gate circuit prohibits transmission of the synchronization signal from the synchronization signal demodulating circuit to the synchronization clock generating circuit for a period covering when a synchronization signal is obtained by the synchronization signal demodulating circuit until a subsequent synchronization signal is obtained thereby.

40. A method of reproducing a synchronization signal in a system having a disc mechanism which includes at least one servo disc and generates a particular servo signal based on information, including a particular servo pattern, read from the servo disc, the method comprising the steps of:

reading the particular servo pattern from the servo disc and generating in response thereto a corresponding, particular servo signal, the particular servo pattern comprising a synchronization, pattern including a first servo pattern and a second servo pattern, following after the first servo pattern, and the corresponding, particular servo signal comprising a synchronization signal including first and second servo signals respectively corresponding to the first and second servo patterns;

demodulating the synchronization signal utilizing a synchronization signal demodulating circuit including:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

filtering spike noise utilizing a gate circuit wherein the synchronization pattern has two peaks;

making the demodulated synchronization signal at least one of enabling and disabling according to control information generated under a particular condition; and generating a synchronization clock signal in synchronization with the demodulated synchronization signal when the demodulated synchronization signal is enabled, to thereby reproduce the synchronization signal.

41. A method as set forth in claim 40, further comprising a step of generating control information for making the demodulated synchronization signal effective after a rotational speed of the servo disc reaches a particular speed and thus a processing for positioning the corresponding servo head on a designated cylinder in the disc mechanism is started.

42. A method as set forth in claim 41, wherein the step of demodulating a synchronization signal comprises a step of starting the demodulating operation after a rotational speed of the servo disc reaches the particular speed and thus a processing for positioning the corresponding servo head on a designated cylinder in the disc mechanism is started.

43. A method as set forth in claim 41, further comprising a step of effecting a phase-locked loop control of the generated synchronization clock signal.

44. A method as set forth in claim 43, further comprising a step of repeatedly counting the phase-locked loop controlled synchronization clock signal at every generation thereof and, based on a result of the counting, generating part of the control information.

45. An apparatus for reproducing a synchronization signal in a disc storage system, comprising:

(a) a disc mechanism including a plurality of information storage discs, in one of which a particular servo pattern is recorded, and a corresponding plurality of reproducing heads, one of the reproducing heads reading the particular servo pattern from the corresponding information storage disc to thereby output a corresponding, particular servo signal, the particular servo pattern including a synchronization pattern comprising a first servo pattern and a second servo pattern, following after the first servo pattern, and the particular servo signal comprising a synchronization signal including first and second servo signals respectively corresponding to the first and second servo patterns;

(b) a synchronization signal demodulating means, responsive to the particular servo signal, for demodulating the synchronization signal in synchronization with a rotation of the information storage discs, wherein the synchronization signal demodulating means includes:

(b-1) a first monostable multivibrator outputting first and second pulses triggered by the first and second servo signals, respectively;

(b-2) a second monostable multivibrator outputting a window signal triggered by the first pulse, the window signal having a pulse width longer than an interval between the first pulse and the second pulse;

(b-3) a first gate, connected to the first monostable multivibrator and the second monostable multivibrator, inputting the first and second pulses and the window signal, outputting the first pulse to the second monostable multivibrator and gating the second pulse when the second pulse exists within the window signal;

(b-4) a second gate, connected to the first monostable multivibrator and the second monostable multivibrator, inputting the first and second pulses and the window signal and outputting the synchronization signal when the second pulse exists within the window signal;

(c) synchronization clock generating means for generating a clock signal with a particular frequency in synchronization with the synchronization signal, said clock signal being used for positioning said reproducing heads; and (d) gate means, operatively connected between the synchronization signal demodulating means and the synchronization clock generating means, for prohibiting transmission of the synchronization signal from the synchronization signal demodulating means to the synchronization clock generating means for a particular period, and for filtering spike noise.

46. An apparatus for reproducing a synchronization signal in a disc storage system, comprising:

a disc mechanism including a plurality of information storage discs, in one of which a particular servo pattern is recorded, and a corresponding plurality of reproducing heads, one of the reproducing heads reading the particular servo pattern from the corresponding information storage disc to thereby output a corresponding, particular servo signal, the particular servo pattern including a synchronization pattern comprising a first servo pattern and a second servo pattern, following after the first servo pattern, and the particular servo signal comprising a synchronization signal including first and second servo signals respectively corresponding to the first and second servo patterns;

synchronization signal demodulating means, responsive to the servo signals from the disc mechanism, for demodulating the synchronization signal in synchronization with a rotation of the information storage discs, wherein the synchronization signal demodulating means includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

synchronization clock generating means for generating a clock signal with a particular frequency in synchronization with the synchronization signal, said clock signal being used for positioning said reproducing heads; and gate means, including a flip flop and operatively connected between the synchronization signal demodulating means and the synchronization clock generating means, for prohibiting transmission of the synchronization signal from the synchronization signal demodulating means to the synchronization clock generating means for a particular period, and for filtering spike noise.

47. An apparatus for reproducing a synchronization signal in a disc storage system, comprising:

a disc mechanism including a servo disc, in which a particular servo pattern is recorded, and a servo head reading the particular servo pattern from the servo disc to thereby output a corresponding, particular servo signal, the particular servo pattern comprising a synchronization pattern including a first servo pattern and a second servo pattern, following after the first servo pattern, and the corresponding, particular servo signal comprising a synchronization signal including first and second servo signals respectively corresponding to the first and second servo patterns;

synchronization signal demodulating means, responsive to the particular servo signal from the disc mechanism, for demodulating the synchronization signal in synchronization with a rotation of the servo disc, wherein the synchronization signal demodulating means includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

synchronization clock generating means for generating a clock signal with a particular frequency in synchronization with the synchronization signal;

gate means, including a flip flop and operatively connected between the synchronization signal demodulating means and the synchronization clock generating means, for prohibiting transmission of the synchronization signal from the synchronization signal demodulating means to the synchronization clock generating means for a particular period, and for filtering spike noise;

head positioning means for generating a position signal indicating a position of the servo head based on the servo signal from the disc mechanism and window signals from the synchronization clock generating means and, based on the position signal, controlling a drive motor provided in the disc mechanism to cause the servo head to follow a designated target position; and control means, responsive to the clock signal transmitted from the synchronization clock generating means, for generating control signals for at least one of enabling and disabling the gate means, and controlling the head positioning means and the synchronization signal demodulating means.

48. An apparatus for reproducing a synchronization signal in a disc storage system, comprising:

a disc mechanism including a servo disc, in which at least one particular servo pattern is recorded, and a servo head reading the particular servo pattern from the servo disc to output a corresponding, particular servo signal, the particular servo pattern comprising a synchronization pattern including a first servo pattern and a second servo pattern, following after the first servo pattern, and the particular servo signal comprising a synchronization signal including first and second servo signals with respectively corresponding to the first and second servo patterns;

a synchronization signal demodulating circuit, responsive to the servo signal from the disc mechanism, demodulating the synchronization signal in synchronization with a rotation of the servo disc, wherein the synchronization signal demodulating circuit includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

a synchronization clock generating circuit generating a clock signal with a particular frequency in synchronization with the synchronization signal;

a gate circuit, including a flip flop and operatively connected between the synchronization signal demodulating circuit and the synchronization clock generating circuit, prohibiting transmission of the synchronization signal from the synchronization signal demodulating circuit to the synchronization clock generating circuit for a particular period, and filtering spike noise;

head positioning circuit generating a position signal indicating a position of the servo head based on the servo signal from the disc mechanism and window signals from the synchronization clock generating circuit and, based on the position signal, controlling a drive motor provided in the disc mechanism to cause the servo head to follow a designated target position; and control device, responsive to the clock signal transmitted from the synchronization clock generating circuit, generating control signals for enabling or disabling the gate circuit, and controlling the head positioning circuit and the synchronization signal demodulating circuit.

49. An apparatus for reproducing a synchronization signal in a magnetic disc storage system, comprising:

a magnetic disc mechanism including a servo disc in which a particular servo pattern is recorded, a servo head reading the particular servo pattern from the servo disc to output a corresponding, particular servo signal, and a drive motor driving the servo head to follow a designated target position, the particular servo pattern comprising a synchronization pattern including a first servo pattern and a second servo pattern, following after the first servo pattern, and the particular servo signal comprising a synchronization signal including first and second servo signals respectively corresponding to the first and second servo patterns;

a synchronization signal demodulating circuit, responsive to the particular servo signal from the magnetic disc mechanism, demodulating the synchronization signal in synchronization with a rotation of the servo disc, wherein the synchronization signal demodulating circuit includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

a synchronization clock generating circuit generating a clock signal with a particular frequency in synchronization with the synchronization signal;

a gate circuit, including a flip flop and operatively connected between the synchronization signal demodulating circuit and the synchronization clock generating circuit, filtering spike noise;

a head positioning circuit generating a position signal indicating a position of the servo head based on the servo signal from the disc mechanism and window signals from the synchronization clock generating circuit and, based on the position signal, controlling the drive motor to cause the servo head to follow the designated target position; and a processor, responsive to the clock signal transmitted from the synchronization clock generating circuit, generating control signals for at least one of enabling and disabling the gate circuit, and controlling the head positioning circuit and the synchronization signal demodulating circuit, wherein the gate circuit prohibits transmission of the synchronization signal from the synchronization signal demodulating circuit to the synchronization clock generating circuit for a period covering from when a synchronization signal is obtained by the synchronization signal demodulating circuit until a subsequent synchronization signal is obtained thereby.

50. A method of reproducing a synchronization signal in a system having a disc mechanism, which includes at least one servo disc and generates a particular servo signal based on information, including a particular servo pattern, from the servo disc, the method comprising the steps of:

reading the particular servo pattern from the servo disc and generating in response thereto a corresponding, particular servo signal, the particular servo pattern comprising a synchronization pattern including a first servo pattern and a second servo pattern, following after the first servo pattern, and the corresponding, particular servo signal comprising a synchronization signal including first and second servo signals corresponding to the first and second servo patterns, respectively;

demodulating the synchronization signal utilizing a synchronization signal demodulating circuit including:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate connected to the first monostable multivibrator and the second monostable multivibrator, inputting the first and second pulses and the window signal and outputting the synchronization signal when the second pulse exists within the window signal;

filtering spike noise utilizing a gate circuit including a flip flop;

making the demodulated synchronization signal at least one of enabling and disabling according to control information generated under a particular condition; and generating a synchronization clock signal in synchronization with the demodulated synchronization signal when the demodulated synchronization signal is enabled, to thereby reproduce the synchronization signal.

51. An apparatus for reproducing a synchronization signal in a disc storage system, comprising: a disc mechanism including a plurality of information storage discs in one of which is recorded a particular servo pattern comprising a synchronization pattern and a peak detection pattern and a corresponding plurality of reproducing heads, one of the reproducing heads reading the particular servo pattern from the corresponding information storage disc to thereby output a corresponding, particular servo signal, the particular servo pattern comprising a synchronization pattern including a first servo pattern and a second servo pattern, following after the first servo pattern, and the particular servo signal comprising a synchronization signal including first and second servo signals respectively corresponding to the first and second servo patterns;

synchronization signal demodulating means, responsive to the particular servo signal from the disc mechanism, for demodulating the synchronization signal in synchronization with a rotation of the information storage discs, wherein the synchronization signal demodulating means includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

synchronization clock generating means for generating a clock signal with a particular frequency in synchronization with the particular synchronization signal, said clock signal being used for positioning said reproducing heads; and gate means, including a flip flop and operatively connected between the synchronization signal demodulating means and the synchronization clock generating means, for prohibiting transmission of the synchronization signal from the synchronization signal demodulating means to the synchronization clock generating means for a particular period corresponding to a time interval between a synchronization pattern and a subsequent synchronization pattern, and for filtering spike noise.

52. An apparatus for reproducing a synchronization signal in a disc storage system, comprising:

a disc mechanism including a servo disc, on which is recorded a particular servo pattern comprising a synchronization pattern and a peak detection pattern, and a servo head reading the particular servo pattern from the servo disc to thereby output a corresponding, particular servo signal, comprising a synchronization signal and a peak detection signal respectively corresponding to the synchronization pattern and the peak detection pattern read from the disc, and wherein the synchronization pattern includes a first servo pattern and a second servo pattern, following after the first servo pattern, and the particular servo signal comprises a synchronization, signal corresponding to the synchronization pattern and including first and second servo signals respectively corresponding to the first and second servo patterns;

synchronization signal demodulating means, responsive to the particular servo signal from the disc mechanism, for demodulating the synchronization signal in synchronization with a rotation of the servo disc, wherein the synchronization signal demodulating means includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

synchronization clock generating means for generating a clock signal with a particular frequency in synchronization with the synchronization signal;

gate means, including a flip flop and operatively connected between the synchronization signal demodulating means and the synchronization clock generating means, for prohibiting transmission of the synchronization signal from the synchronization signal demodulating means to the synchronization clock generating means for a particular period corresponding to a time between a synchronization pattern and a subsequent synchronization pattern, and for filtering spike noise;

head positioning means for generating a position signal indicating a position of the servo head based on the servo signal from the disc mechanism and window signals from the synchronization clock generating means and, based on the position signal, controlling a drive motor provided in the disc mechanism to cause the servo head to follow a designated target position; and control means, responsive to the clock signal transmitted from the synchronization clock generating means, for generating control signals for at least one of enabling and disabling the gate means, and controlling the head positioning means and the synchronization signal demodulating means.

53. An apparatus for reproducing a synchronization signal in a disc storage system, comprising:

a disc mechanism including a servo disc, on which is recorded a particular servo pattern comprising a synchronization pattern and a peak detection pattern, and a servo head reading the particular servo pattern from the servo disc to thereby output a corresponding, particular servo signal, comprising a synchronization signal and a peak detection signal respectively corresponding to the synchronization pattern and the peak detection pattern read from the disc, and wherein the synchronization pattern includes a first servo pattern and a second servo pattern, following after the first servo pattern, and the particular servo signal comprises a synchronization signal corresponding to the synchronization pattern, the synchronization signal including first and second servo signals respectively corresponding to the first and second servo patterns;

a synchronization signal demodulating circuit, responsive to the particular servo signal from the disc mechanism, demodulating the synchronization signal in synchronization with a rotation of the servo disc, wherein the synchronization signal demodulating circuit includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

a synchronization clock generating circuit generating a clock signal with a particular frequency in synchronization with the synchronization signal;

a gate circuit, including a flip flop and operatively connected between the synchronization signal demodulating circuit and the synchronization clock generating circuit, prohibiting transmission of the synchronization signal from the synchronization signal demodulating circuit to the synchronization clock generating circuit for a particular period corresponding to a time interval between a synchronization pattern and a subsequent synchronization pattern, and filtering spike noise;

a head positioning circuit generating a position signal indicating a position of the servo head based on the servo signal from the disc mechanism and window signals from the synchronization clock generating circuit and, based on the position signal, controlling a drive motor provided in the disc mechanism to cause the servo head to follow a designated target position; and a control device, responsive to the clock signal transmitted from the synchronization clock generating circuit, generating control signals for enabling or disabling the gate circuit, and controlling the head positioning circuit and the synchronization signal demodulating circuit.

54. An apparatus for reproducing a synchronization signal in a magnetic disc storage system, comprising:

a magnetic disc mechanism including a servo disc on which is recorded a particular servo pattern comprising a synchronization pattern and a peak detection pattern, a servo head reading the particular servo pattern from the servo disc to output a corresponding, particular servo signal, and a drive motor driving the servo head to follow a designated target position wherein the synchronization pattern includes a first servo pattern and a second servo pattern, following after the first servo pattern, and the particular servo signal comprises a synchronization signal corresponding to the synchronization pattern, the synchronization signal including first and second servo signals respectively corresponding to the first and second servo patterns;

a synchronization signal demodulating circuit, responsive to the particular servo signal from the magnetic disc mechanism, demodulating the synchronization signal in synchronization with a rotation of the servo disc, wherein the synchronization signal demodulating circuit includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exits within the window signal;

a synchronization clock generating circuit generating a clock signal with a particular frequency in synchronization with the synchronization signal;

a gate circuit, including a flip flop and operatively connected between the synchronization signal demodulating circuit and the synchronization clock generating circuit, filtering spike noise;

a head positioning circuit generating a position signal indicating a position of the servo head based on the servo signal from the disc mechanism and window signals from the synchronization clock generating circuit and, based on the position signal, controlling the drive motor to cause the servo head to follow the designated target position; and a processor, responsive to the clock signal transmitted from the synchronization clock generating circuit, generating control signals for at least one of enabling and disabling the gate circuit, and controlling the head positioning circuit and the synchronization signal demodulating circuit, wherein the gate circuit prohibits transmission of the synchronization signal from the synchronization signal demodulating circuit to the synchronization clock generating circuit for a period covering from when a synchronization signal is obtained by the synchronization signal demodulating circuit until a subsequent synchronization signal is obtained thereby.

55. A method of reproducing a synchronization signal in a system having a disc mechanism which includes at least one servo disc and generates a particular servo signal based on information, including a particular servo pattern, from the servo disc, the method comprising the steps of:

reading the particular servo pattern from the servo disc and generating in response thereto a corresponding, particular servo signal, the particular servo pattern comprising a synchronization pattern including a first servo pattern and a second servo pattern, following after the first servo pattern, and the corresponding, particular servo signal comprising a synchronization signal including first and second servo signals corresponding to the first and second servo patterns, respectively;

demodulating the synchronization signal based on the particular servo signal from the disc mechanism utilizing a synchronization signal demodulating circuit including:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

filtering spike noise utilizing a gate circuit including a flip flop;

making the demodulated synchronization signal at least one of enabling and disabling according to control information generated under a particular condition; and generating a synchronization clock signal in synchronization with the demodulated synchronization signal when the demodulated synchronization signal is enabled, to thereby reproduce the synchronization signal.

56. An apparatus for reproducing a synchronization signal in a disc storage system, comprising:

(a) a disc mechanism including a plurality of information storage discs on one of which a particular servo pattern is recorded and a corresponding plurality of reproducing heads, one of the reproducing heads reading the particular servo pattern from the corresponding information storage disc to thereby output a corresponding, particular servo signal, the particular servo pattern comprising a synchronization pattern including a first servo pattern and a second servo pattern, following after the first servo pattern, and the particular servo signal comprising a synchronization signal including first and second servo signals respectively corresponding to the first and second servo patterns;

(b) synchronization signal demodulating means, responsive to the particular servo signal, for demodulating the synchronization signal in synchronization with a rotation of the information storage disc, wherein the synchronization signal demodulating means includes:

a first monostable multivibrator outputting first and second pulses triggered by the first and second servo signals, respectively;

a second monostable multivibrator outputting a window signal triggered by the first pulse, the window signal having a pulse width longer than an interval between the first pulse and the second pulse;

a first gate, connected to the first monostable multivibrator and the second monostable multivibrator, inputting the first and second pulses and the window signal, outputting the first pulse to the second monostable multivibrator and gating the second pulse when the second pulse exists within the window signal;

a second gate, connected to the first monostable multivibrator and the second monostable multivibrator, inputting the first and second pulses and the window signal and outputting the synchronization signal when the second pulse exists within the window signal;

(c) synchronization clock generating means for generating a clock signal with a particular frequency in synchronization with the synchronization signal, said clock signal being used for positioning said reproducing heads; and (d) gate means, including a flip flop and operatively connected between the synchronization signal demodulating means and the synchronization clock generating means, for prohibiting transmission of the synchronization signal from the synchronization signal demodulating means to the synchronization clock generating means for a particular period, and for filtering spike noise.

* * * * *

UNITED STATES PATENT AND TRADEMARK OFFICE
CERTIFICATE OF CORRECTION

PATENT NO. : 5,724,204
DATED : Mar. 3, 1998
INVENTOR(S) : SHINOHARA et al.

It is certified that error appears in the above-identified patent and that said Letters Patent is hereby corrected as shown below:

Col. 1, line 22, delete "a";
line 23, delete "a".

Col. 8, line 63, delete "a constitution of".

Col. 12, line 65 (claim 3, line 12), change "signal" to --signals--.

Col. 15, line 11 (claim 12, line 47), after "signal" delete ",".

Col. 20, line 33 (claim 34, line 11), change "frog" to --from--.

Col. 22, line 61 (claim 40, line 9), after "synchronization" delete ",".

Col. 28, line 67 (claim 51, line 2), after "comprising:" begin a new paragraph.

Signed and Sealed this

Ninth Day of June, 1998

Attest:

BRUCE LEHMAN

Attesting Officer     Commissioner of Patents and Trademarks